(12) United States Patent
Zhang et al.

(10) Patent No.: US 12,114,013 B2
(45) Date of Patent: Oct. 8, 2024

(54) IMPLICIT SELECTION OF TRANSFORM CANDIDATES

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Zhipin Deng, Beijing (CN); Yang Wang, Beijing (CN); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 174 days.

(21) Appl. No.: 17/540,980

(22) Filed: Dec. 2, 2021

(65) Prior Publication Data

US 2022/0094987 A1 Mar. 24, 2022

Related U.S. Application Data

(63) Continuation of application No. PCT/CN2020/094904, filed on Jun. 8, 2020.

(30) Foreign Application Priority Data

Jun. 6, 2019 (WO) ................ PCT/CN2019/090261
Jun. 15, 2019 (WO) ................ PCT/CN2019/091435
(Continued)

(51) Int. Cl.
*H04N 19/61* (2014.01)
*H04N 19/105* (2014.01)
(Continued)

(52) U.S. Cl.
CPC .......... *H04N 19/61* (2014.11); *H04N 19/105* (2014.11); *H04N 19/132* (2014.11);
(Continued)

(58) Field of Classification Search
CPC .... H04N 19/61; H04N 19/105; H04N 19/132; H04N 19/159; H04N 19/176;
(Continued)

(56) References Cited

U.S. PATENT DOCUMENTS 8,274,514 B1 * 9/2012 Martino .................... G06T 3/00
345/441
8,340,193 B2 * 12/2012 Lu ........................ H04N 19/395
375/240.19
(Continued)

FOREIGN PATENT DOCUMENTS

CN 103098473 A 5/2013
CN 107925763 A 4/2018
(Continued)

OTHER PUBLICATIONS

Tsung-chuan Ma et al., "Non-CE6: Unified Transform Selection for implicit MTS"; JVET-N0338; Geneva, CH, Mar. 25-29, 2019 ( Year: 2019).*
(Continued)

*Primary Examiner* — Dramos Kalapodas
(74) *Attorney, Agent, or Firm* — Perkins Coie LLP

(57) ABSTRACT

Devices, systems and methods for digital video coding, which includes using multiple transforms, are described. In a representative aspect, a method for video processing includes making a decision, based on one or more decoded coefficients and in an absence of one or more transform indices, regarding an application of a transform to a current
(Continued)

block of a video, and performing, based on the decision, a conversion between the current block and a bitstream representation of the video.

19 Claims, 20 Drawing Sheets

(30) Foreign Application Priority Data

Jul. 30, 2019 (WO) ................ PCT/CN2019/098468
Aug. 21, 2019 (WO) ................ PCT/CN2019/101793

(51) Int. Cl.
   *H04N 19/132*   (2014.01)
   *H04N 19/159*   (2014.01)
   *H04N 19/176*   (2014.01)
   *H04N 19/625*   (2014.01)

(52) U.S. Cl.
   CPC ......... *H04N 19/159* (2014.11); *H04N 19/176* (2014.11); *H04N 19/625* (2014.11)

(58) Field of Classification Search
   CPC .... H04N 19/625; H04N 19/157; H04N 19/18; H04N 19/70; H04N 19/12
   See application file for complete search history.

(56) References Cited

U.S. PATENT DOCUMENTS

| | | | |
|---|---|---|---|
| 9,661,338 | B2 | 5/2017 | Karczewicz et al. |
| 9,883,184 | B2 | 1/2018 | Rapaka et al. |
| 10,057,578 | B2 | 8/2018 | Rapaka et al. |
| 10,200,719 | B2 * | 2/2019 | Zhang .................. G06F 17/147 |
| 10,382,768 | B2 | 8/2019 | Huang et al. |
| 10,405,000 | B2 | 9/2019 | Kao et al. |
| 10,419,763 | B2 | 9/2019 | Huang et al. |
| 10,440,399 | B2 | 10/2019 | Karczewicz et al. |
| 10,506,254 | B2 | 12/2019 | Li et al. |
| 10,560,723 | B2 | 2/2020 | Zhang et al. |
| 10,574,993 | B2 | 2/2020 | Zhang et al. |
| 10,582,203 | B2 | 3/2020 | Huang et al. |
| 10,609,367 | B2 | 3/2020 | Zhao et al. |
| 10,609,414 | B2 | 3/2020 | Zhang et al. |
| 10,652,576 | B2 | 5/2020 | Li et al. |
| 10,666,937 | B2 | 5/2020 | Zhao et al. |
| 11,647,214 | B2 | 5/2023 | Said et al. |
| 2009/0074053 | A1 | 3/2009 | Narasimhan et al. |
| 2012/0287989 | A1 * | 11/2012 | Budagavi ............ H04N 19/42 375/240.03 |
| 2013/0266233 | A1 | 10/2013 | Kondo |
| 2014/0044179 | A1 | 2/2014 | Li et al. |
| 2014/0056347 | A1 | 2/2014 | Xu et al. |
| 2014/0126650 | A1 | 5/2014 | Lim |
| 2014/0226721 | A1 | 8/2014 | Joshi et al. |
| 2014/0286413 | A1 | 9/2014 | Joshi et al. |
| 2015/0003518 | A1 | 1/2015 | Nguyen et al. |
| 2015/0117520 | A1 * | 4/2015 | Zhou .................. H04N 19/18 375/240.03 |
| 2016/0100175 | A1 | 4/2016 | Laroche et al. |
| 2016/0219290 | A1 | 7/2016 | Zhao et al. |
| 2016/0353112 | A1 | 12/2016 | Zhang et al. |
| 2017/0188029 | A1 | 6/2017 | An et al. |
| 2018/0020218 | A1 * | 1/2018 | Zhao .................. H04N 19/124 |
| 2018/0077417 | A1 | 3/2018 | Huang |
| 2018/0091817 | A1 * | 3/2018 | Sole .................. H04N 19/159 |
| 2018/0098081 | A1 | 4/2018 | Zhao et al. |
| 2018/0176582 | A1 | 6/2018 | Zhao et al. |
| 2018/0205949 | A1 | 7/2018 | Hsiang et al. |
| 2018/0332289 | A1 | 11/2018 | Huang |
| 2019/0104323 | A1 | 4/2019 | Baylon et al. |
| 2020/0092555 | A1 | 3/2020 | Zhao et al. |
| 2020/0099924 | A1 | 3/2020 | Seregin et al. |
| 2020/0260070 | A1 | 3/2020 | Yoo et al. |
| 2020/0228834 | A1 | 7/2020 | Li et al. |
| 2020/0288121 | A1 | 9/2020 | Zhao et al. |
| 2020/0389671 | A1 | 12/2020 | Zhao et al. |
| 2020/0396455 | A1 | 12/2020 | Liu et al. |
| 2021/0014533 | A1 | 1/2021 | Tsukuba |
| 2021/0195195 | A1 * | 6/2021 | Zhao .................... H04N 19/103 |
| 2021/0211727 | A1 | 7/2021 | Salehifar et al. |
| 2022/0070465 | A1 | 3/2022 | Zhu et al. |
| 2022/0086490 | A1 | 3/2022 | Koo et al. |
| 2022/0094929 | A1 | 3/2022 | Zhang et al. |
| 2022/0094930 | A1 | 3/2022 | Zhang et al. |
| 2022/0109878 | A1 | 4/2022 | Koo et al. |

FOREIGN PATENT DOCUMENTS

| | | | |
|---|---|---|---|
| CN | 108632611 A | 10/2018 | |
| CN | 109089117 A | 12/2018 | |
| CN | 109547801 A | 3/2019 | |
| CN | 109691101 A | 4/2019 | |
| CN | 109716772 A | 5/2019 | |
| WO | WO-2012006574 A2 * | 1/2012 | ............. H04N 19/11 |
| WO | 2015053697 A1 | 4/2015 | |
| WO | 2015142556 A2 | 9/2015 | |
| WO | 2016123388 A1 | 8/2016 | |
| WO | 2017091776 A1 | 6/2017 | |
| WO | 2017157249 A1 | 9/2017 | |
| WO | 2018064517 A1 | 4/2018 | |
| WO | WO-2018161954 A1 * | 9/2018 | ............. H04N 19/11 |
| WO | 2018226067 A1 | 12/2018 | |
| WO | 2018054269 A1 | 3/2019 | |
| WO | 2019074291 A1 | 4/2019 | |
| WO | 2019076138 A1 | 4/2019 | |
| WO | 2019114713 A1 | 6/2019 | |

OTHER PUBLICATIONS

Han Gao et al., "Non-CE6: Unification of Implicit Transform Core Selection"; JVET-N0172-v3, Geneva, CH, Mar. 19-27, 2019 (Year: 2019).*

Zhou et al. "CE6-related: A Study of Primary Transforms," Joint Video Experts Team (JVET) of ITU-T SG 16 WP 3 and ISO/IEC JTC 1/SC 29/WG 11 13th Meeting: Marrakesh, MA, Jan. 9-18, 2019, document JVET-M0046, 2019. (Year: 2019).*

Abdoli et al."CE8: BDPCM with Horizontal/Vertical Predictor and Independently Decodable Areas (Test 8.3.1b)," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0057, 2019.

Ankur et al. "DCT/DST-Based Transform Coding For Intra Prediction in Image/Video Coding," IEEE Transactions on Image Processing, Oct. 2013, 22(10):3974-3981.

Bross et al. "Non-CE8: Unified Transform Type Signalling and Residual Coding for Transform Skip," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0464, 2019.

Bross et al. "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N1001 v7 and v8, 2019.

Bross et al. "Versatile Video Coding (Draft 6), "Joint Video Experts Team (JVET)of ITU-T SG 16 WP 3 and ISO/IEC JTC 1/SC 29/WG 1115th Meeting: Gothenburg, SE, Jul. 3-12, 2019, document JVET-O2001 vC and v14, 2019.

Choi et al. "CE8-related : Transform Skip Restriction," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0430, 2019.

De-Luxian-Hernandez et al. "CE3: Intra Sub-Partitions Coding Mode (Tests 1.1.1 and 1.1.2)," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0102, 2019.

(56) References Cited

OTHER PUBLICATIONS

Gao et al. "Non-CE6: Unification of Implicit Transform Core Selection," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0172, 2019.
Karczewicz et al. "CE8-Related: Quantized Residual BDPCM," oint Video Experts Team (JVET) of ITU-T SG 16 WP 3 and ISO/IEC JTC 1/SC 29/WG 11 14th Meeting: Geneva, CH, Mar. 19-27, 2019, document JVET-N0413, 2019.
Koo et al. "CE 6-2.1: Reduced Secondary Transform (RST)," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0133, 2018.
Koo et al. "CE6: Reduced Secondary Transform (RST) (CE6-3.1)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0193, 2019.
Pfaff et al. "CE3: Affine Linear Weighted Intra Prediction (CE3-4.1, CE3-4.2)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0217, 2019.
Salehifar et al. "CE 6.2.6: Reduced Secondary Transform (RST)," Joint Video Experts Team (JVET) of ITU-T SG 16 WP 3 and ISO/IEC JTC 1/SC 29/WG 11 11th Meeting: Ljubljana, SI, Jul. 10-18, 2018, document JVET-K0099, 2018.
Ma et al. "Non-CE6: Unified Transform Selection for implicit MTS," Joint Video Experts Team (JVET) of ITU-T SG 16 WP 3 and ISO/IEC JTC 1/SC 29/WG 11 14th Meeting: Geneva, CH, Mar. 25-29, 2019, document JVET-N0338, 2019.
International Search Report and Written Opinion from International Patent Application No. PCT/CN2020/094904 dated Sep. 10, 2020 (13 pages).
International Search Report and Written Opinion from International Patent Application No. PCT/CN2020/094905 dated Sep. 9, 2020 (10 pages).
International Search Report and Written Opinion from International Patent Application No. PCT/CN2020/094907 dated Sep. 9, 2020 (12 pages).
International Search Report and Written Opinion from International Patent Application No. PCT/CN2020/097021 dated Aug. 31, 2020 (13 pages).
Non Final Office Action from U.S. Appl. No. 17/541,013 dated Nov. 15, 2023.
Cao et al. "Non-CE-6: Implicit Transform Selection Based on Intra Mode." Joint Video Experts Team (JVET) of ITU-T SG 16 WP 3 and ISO/IEC JTC 1/SC 29/WG 11 14th Meeting, Geneva, CH, Mar. 1-27, 2019, document JVET-N0161, 2019.
Chiang et al., "CE6-related: Unified Implicit MTS Between ISP Mode and Regular Intra Mode," Joint Video Experts Team (JVET)of ITU-T SG 16 WP 3 and ISO/IEC JTC 1/SC 29/WG 1114th Meeting: Geneva, CH, Mar. 19-27, 2019, document JVET-N0089, 2019.
Non Final Office Action from U.S. Appl. No. 17/457,473 dated Jan. 11, 2024.
Final Office Action from U.S. Appl. No. 17/541,013 dated Mar. 8, 2024.
Zhou et al. "CE6-related: A Study of Primary Transforms," Joint Video Experts Team (JVET) of ITU-T SG 16 WP 3 and ISO/IEC JTC 1/SC 29/WG 11 13th Meeting: Marrakesh, MA, Jan. 9-18, 2019, documet JVET-M0046, 2019.
First Office Action from Chinese Patent Application No. 202080043276.1 dated May 6, 2024.

\* cited by examiner

┌─────────────────────────────────────────────┐
│ Performing a conversion between a current   │
│ block of a video and a bitstream            │──  1736
│ representation of the video                 │
└─────────────────────────────────────────────┘
```

┌─────────────────────────────────────────────┐
│ Making a decision, for a video region of a  │
│ video, regarding an application of an       │
│ implicit multiple transform set (MTS)       │
│ process and/or an explicit MTS process to   │──  1741
│ the video region using one or more control  │
│ parameters that are based on a coding mode  │
│ of the video region                         │
└─────────────────────────────────────────────┘
                      │
┌─────────────────────────────────────────────┐
│ Performing, based on the decision, a        │
│ conversion between the video region and a   │──  1742
│ bitstream representation of the video       │
└─────────────────────────────────────────────┘
```

FIG. 17H

IMPLICIT SELECTION OF TRANSFORM CANDIDATES

CROSS-REFERENCE TO RELATED APPLICATIONS

This application is a continuation of International Patent Application No. PCT/CN2020/094904, filed on Jun. 8, 2020, which claims the priority to and benefits of International Patent Application No. PCT/CN2019/090261 filed on Jun. 6, 2019, International Patent Application No. PCT/CN2019/091435 filed on Jun. 15, 2019, International Patent Application No. PCT/CN2019/098468 filed on Jul. 30, 2019, and International Patent Application No. PCT/CN2019/101793 filed on Aug. 21, 2019. All the aforementioned patent applications are hereby incorporated by reference in their entireties.

TECHNICAL FIELD

This patent document relates to video coding and decoding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, methods on multiple transforms for video coding, are described. The described methods may be applied to both the existing video coding standards (e.g., High Efficiency Video Coding (HEVC)) and future video coding standards (e.g., Versatile Video Coding (VVC)) or codecs.

In one representative aspect, the disclosed technology may be used to provide an example method for video processing. This method includes making a decision, based on one or more decoded coefficients and in an absence of one or more transform indices, regarding an application of a transform to a current block of a video, and performing, based on the decision, a conversion between the current block and a bitstream representation of the video.

In another representative aspect, the disclosed technology may be used to provide an example method for video processing. This method includes making a decision, based on a set of representative coefficients and in an absence of one or more transform indices, regarding an application of a transform to a current block, and performing, based on the decision, a conversion between the current block and a bitstream representation, wherein the set of representative coefficients is included in a set of significant coefficients, and wherein each of the set of significant coefficients is non-zero.

In yet another representative aspect, the disclosed technology may be used to provide an example method for video processing. This method includes selecting, as part of an implicit selection of transforms (IST) mode, one or more transforms of a transform set from a set of predefined transforms, and applying, as part of performing a conversion between a current block and a bitstream representation, at least one of the one or more transforms to the current block.

In yet another representative aspect, the disclosed technology may be used to provide an example method for video processing. This method includes making a decision, based on a coding mode of a current block of a video, regarding an application of an implicit multiple transform set (MTS) process to the coding mode regardless of a value of an indication of enabling an MTS process in a bitstream representation of the video at a sequence level, a picture level, a sub-picture level, a slice level, a tile group level, a tile level, a brick level, a coding tree unit (CTU) row, or a CTU level, and performing, based on the decision, a conversion between the current block and the bitstream representation, wherein the implicit MTS process includes using a characteristic of the current block to determine a transform used during the conversion.

In yet another representative aspect, the disclosed technology may be used to provide an example method for video processing. This method includes making a decision, based on an enablement of a multiple transform set (MTS) process for a video region of a video, regarding an enablement of an intra subblock partitioning (ISP) mode or a subblock transform (SBT) mode for the video region, and performing, based on the decision, a conversion between the video region and a bitstream representation of the video.

In yet another representative aspect, the disclosed technology may be used to provide an example method for video processing. This method includes making a decision, based on an enablement of an intra subblock partitioning (ISP) mode or a subblock transform (SBT) mode for a video region of a video, regarding an enablement of a multiple transform set (MTS) process for the video region, and performing, based on the decision, a conversion between the video region and a bitstream representation of the video.

In yet another representative aspect, the disclosed technology may be used to provide an example method for video processing. This method includes performing a conversion between a current block of a video and a bitstream representation of the video, wherein the bitstream representation comprises a first syntax element that controls a usage of an implicit multiple transform set (MTS) process on the current block and a second syntax element that controls a usage of an explicit MTS process on the current block, and wherein the first syntax element is different from the second syntax element, wherein the implicit MTS process includes using a characteristic of the current block to determine a transform used during the conversion.

In yet another representative aspect, the disclosed technology may be used to provide an example method for video processing. This method includes making a decision, for a video region of a video, regarding an application of an implicit multiple transform set (MTS) process and/or an explicit MTS process to the video region using one or more control parameters that are based on a coding mode of the video region, and performing, based on the decision, a conversion between the video region and a bitstream representation of the video, wherein the implicit MTS process includes using a characteristic of the current block to determine a transform used during the conversion.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIG. 9 shows an example of the order of processing of the rows of pixels to maximize throughput for 4×N blocks with vertical predictor.

FIGS. 17A-17H show flowcharts of example methods for video processing.

DETAILED DESCRIPTION

1 Introduction

Figure 1:
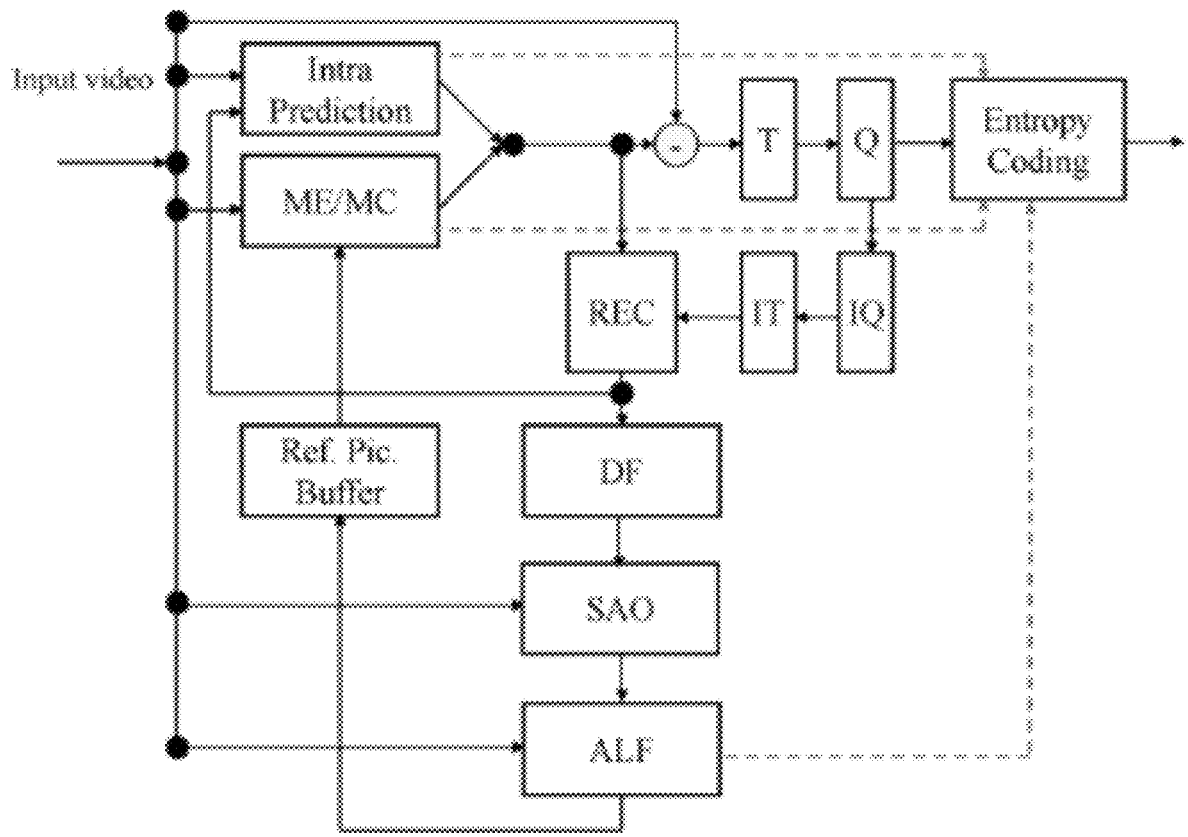
FIG. 1 shows an example of an encoder block diagram.

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding (VVC) standard to be finalized, or other current and/or future video coding standards.

Embodiments of the disclosed technology may be applied to existing video coding standards (e.g., HEVC, H.265) and future standards to improve runtime performance. Section headings are used in the present document to improve readability of the description and do not in any way limit the discussion or the embodiments (and/or implementations) to the respective sections only.

2 Embodiments and Examples for Methods on Multiple Transforms 2.1 Color Space and Chroma Subsampling Color space, also known as the color model (or color system), is an abstract mathematical model which simply describes the range of colors as tuples of numbers, typically as 3 or 4 values or color components (e.g. RGB). Basically speaking, color space is an elaboration of the coordinate system and sub-space.

For video compression, the most frequently used color spaces are YCbCr and RGB.

YCbCr, Y'CbCr, or Y Pb/Cb Pr/Cr, also written as YCBCR or Y'CBCR, is a family of color spaces used as a part of the color image pipeline in video and digital photography systems. Y' is the luma component and CB and CR are the blue-difference and red-difference chroma components. Y' (with prime) is distinguished from Y, which is luminance, meaning that light intensity is nonlinearly encoded based on gamma corrected RGB primaries.

Chroma subsampling is the practice of encoding images by implementing less resolution for chroma information than for luma information, taking advantage of the human visual system's lower acuity for color differences than for luminance.

4:4:4 Format. Each of the three Y'CbCr components have the same sample rate, thus there is no chroma subsampling. This scheme is sometimes used in high-end film scanners and cinematic post production.

4:2:2 Format. The two chroma components are sampled at half the sample rate of luma: the horizontal chroma resolution is halved. This reduces the bandwidth of an uncompressed video signal by one-third with little to no visual difference 4:2:0 Format. In 4:2:0, the horizontal sampling is doubled compared to 4:1:1, but as the Cb and Cr channels are only sampled on each alternate line in this scheme, the vertical resolution is halved. The data rate is thus the same. Cb and Cr are each subsampled at a factor of 2 both horizontally and vertically. There are three variants of 4:2:0 schemes, having different horizontal and vertical siting.

In MPEG-2, Cb and Cr are cosited horizontally. Cb and Cr are sited between pixels in the vertical direction (sited interstitially).

In JPEG/JFIF, H.261, and MPEG-1, Cb and Cr are sited interstitially, halfway between alternate luma samples.

In 4:2:0 DV, Cb and Cr are co-sited in the horizontal direction. In the vertical direction, they are co-sited on alternating lines.

2.2 Coding Flow of a Typical Video Codec

FIG. 1 shows an example of encoder block diagram of VVC, which contains three in-loop filtering blocks: deblocking filter (DF), sample adaptive offset (SAO) and ALF. Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signaling the offsets and filter coefficients. ALF is located at the last processing stage of each picture and can be regarded as a tool trying to catch and fix artifacts created by the previous stages.

2.3 Intra Mode Coding with 67 Intra Prediction Modes

Figure 2:
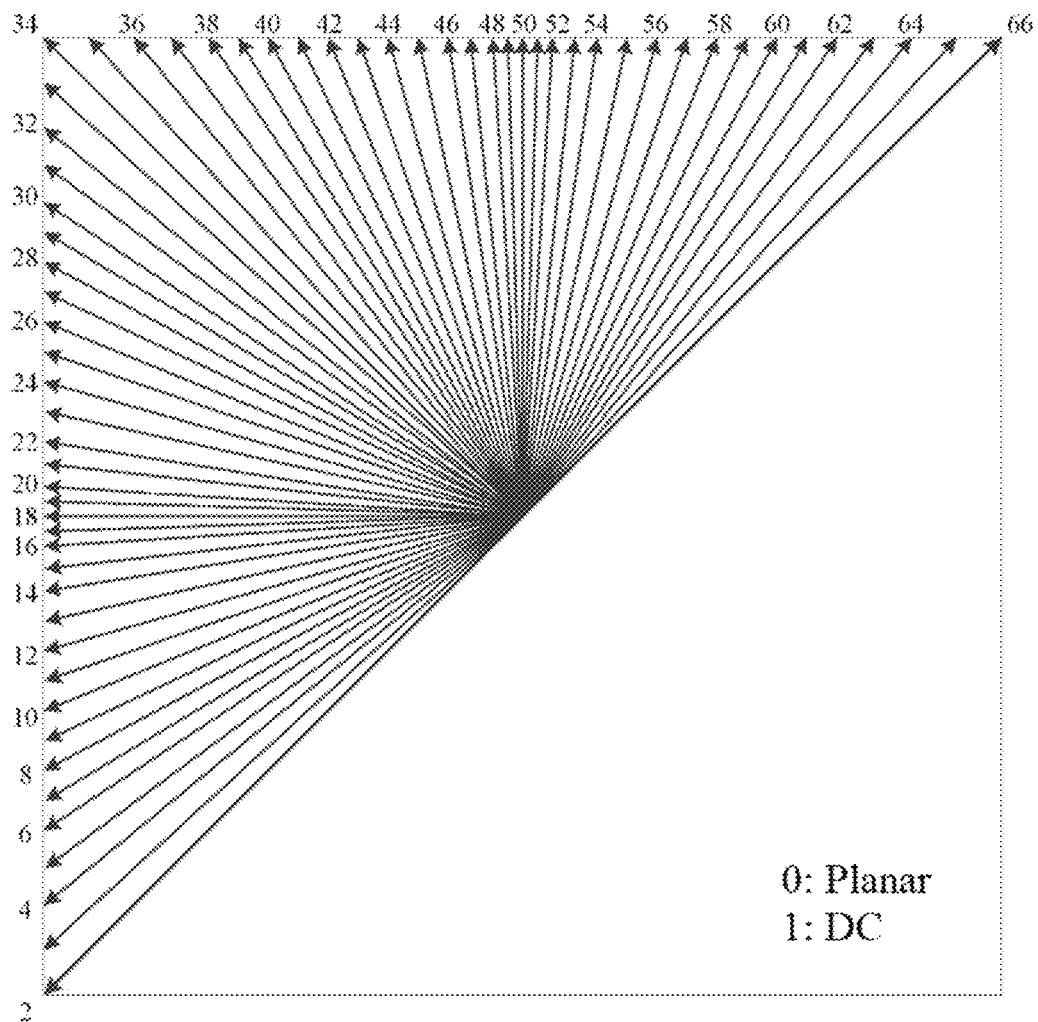
FIG. 2 shows an example of 67 intra prediction modes.

To capture the arbitrary edge directions presented in natural video, the number of directional intra modes is extended from 33, as used in HEVC, to 65. The additional directional modes are depicted as red dotted arrows in FIG. 2, and the planar and DC modes remain the same. These denser directional intra prediction modes apply for all block sizes and for both luma and chroma intra predictions.

Conventional angular intra prediction directions are defined from 45 degrees to −135 degrees in clockwise direction as shown in FIG. 1. In VTM2, several conventional angular intra prediction modes are adaptively replaced with wide-angle intra prediction modes for the non-square blocks. The replaced modes are signaled using the original method and remapped to the indexes of wide angular modes after parsing. The total number of intra prediction modes is unchanged (e.g., 67), and the intra mode coding is unchanged.

In HEVC, every intra-coded block has a square shape and the length of each of its side is a power of 2. Thus, no division operations are required to generate an intra-predictor using DC mode. In VTV2, blocks can have a rectangular shape that necessitates the use of a division operation per block in the general case. To avoid division operations for DC prediction, only the longer side is used to compute the average for non-square blocks.

2.4 Wide-Angle Intra Prediction for Non-Square Blocks

In some embodiments, conventional angular intra prediction directions are defined from 45 degrees to −135 degrees in clockwise direction. In VTM2, several conventional angular intra prediction modes are adaptively replaced with wide-angle intra prediction modes for non-square blocks. The replaced modes are signaled using the original method and remapped to the indexes of wide angular modes after parsing. The total number of intra prediction modes for a certain block is unchanged, e.g., 67, and the intra mode coding is unchanged.

Figure 3A:
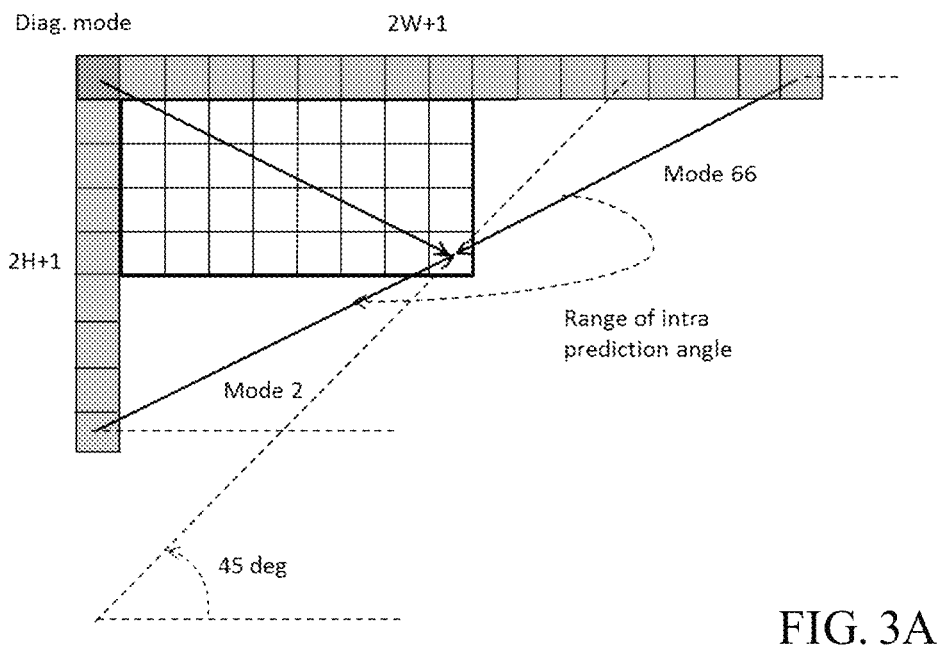
FIGS. 3A and 3B show examples of reference samples for wide-angle intra prediction modes for non-square blocks.
Figure 3B:
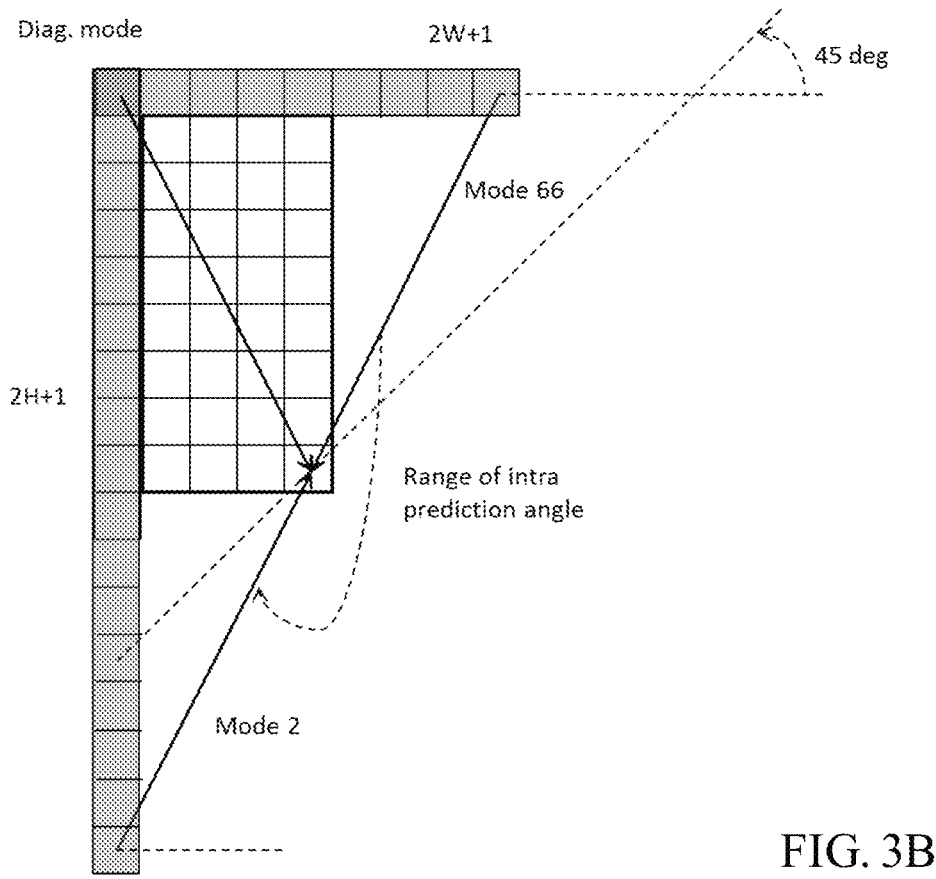

To support these prediction directions, the top reference with length 2W+1, and the left reference with length 2H+1, are defined as shown in the examples in FIGS. 3A and 3B.

In some embodiments, the mode number of replaced mode in wide-angular direction mode is dependent on the aspect ratio of a block. The replaced intra prediction modes are illustrated in Table 1.

TABLE 1

Intra prediction modes replaced by wide-angle modes

| Condition | Replaced intra prediction modes |
|---|---|
| W/H == 2 | Modes 2, 3, 4, 5, 6, 7 |
| W/H > 2 | Modes 2, 3, 4, 5, 6, 7, 8, 9, 10, 11 |
| W/H == 1 | None |
| H/W == ½ | Modes 61, 62, 63, 64, 65, 66 |
| H/W < ½ | Mode 57, 58, 59, 60, 61, 62, 63, 64, 65, 66 |

Figure 4:
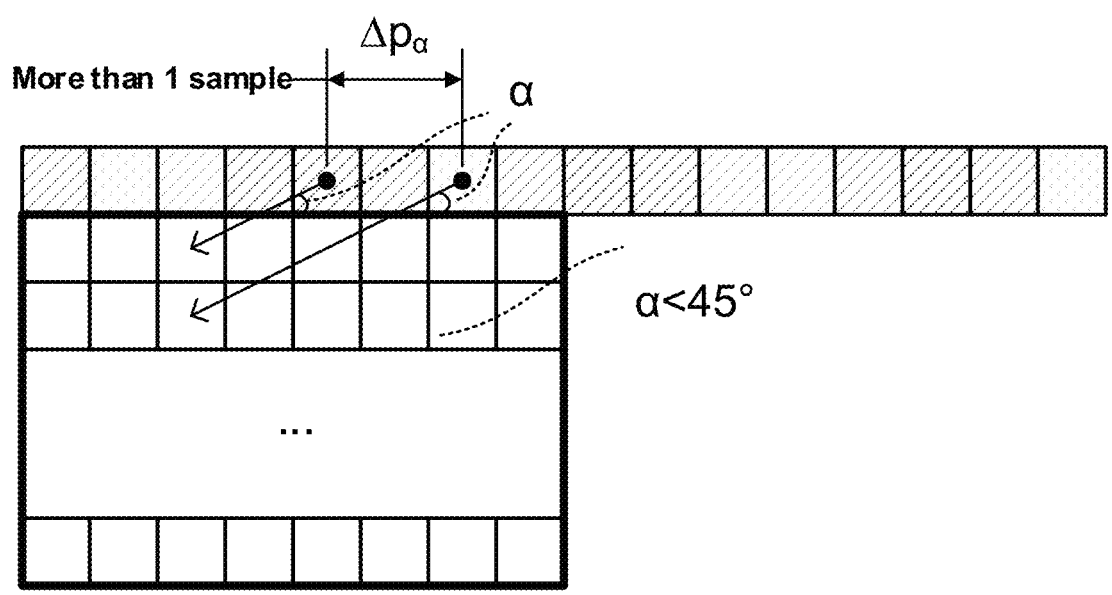
FIG. 4 shows an example of a discontinuity when using wide-angle intra prediction.
Figure 5A:
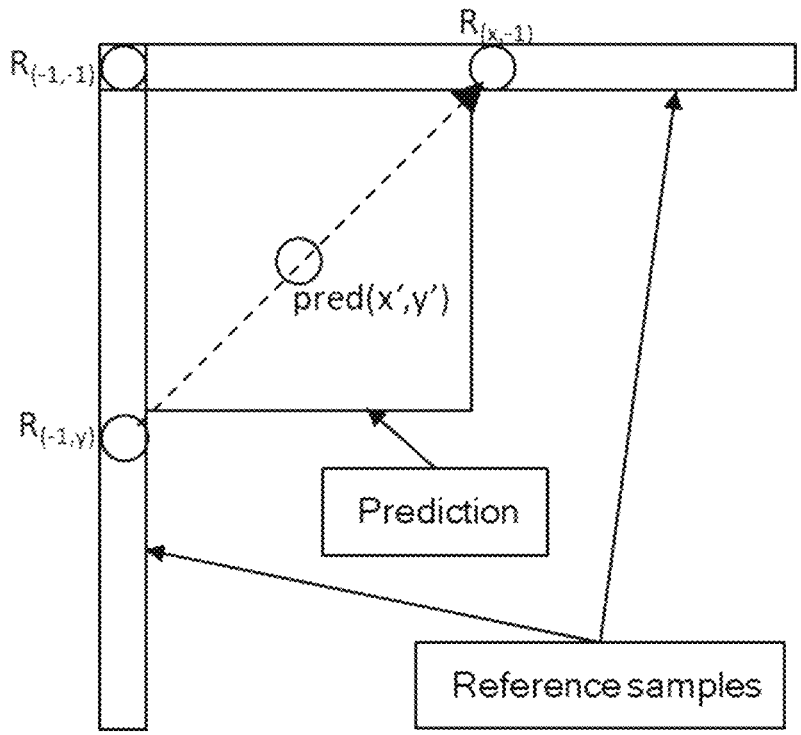
FIGS. 5A-5D show examples of samples used by a position-dependent intra prediction combination (PDPC) method.
Figure 5B:
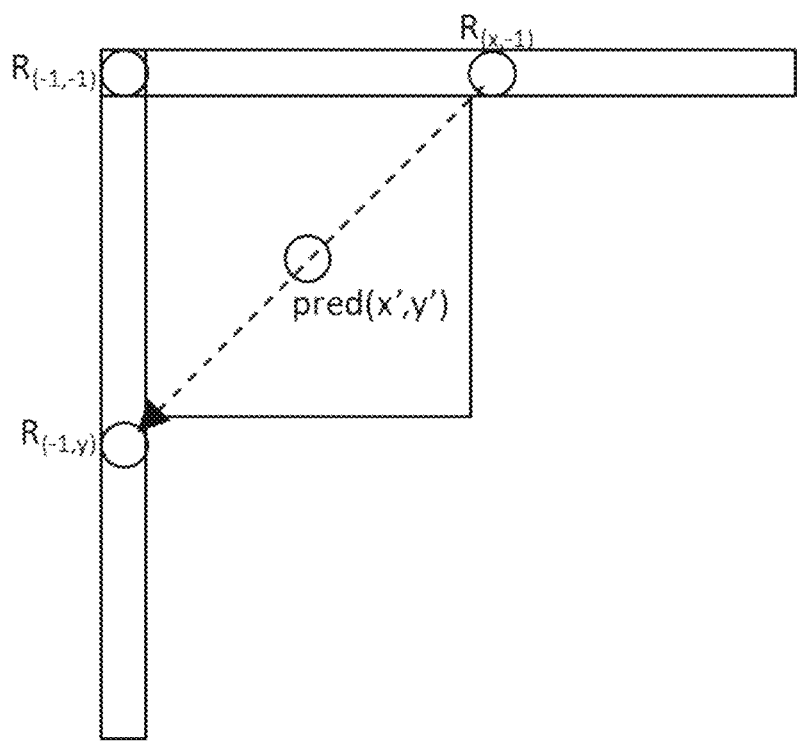
Figure 5C:
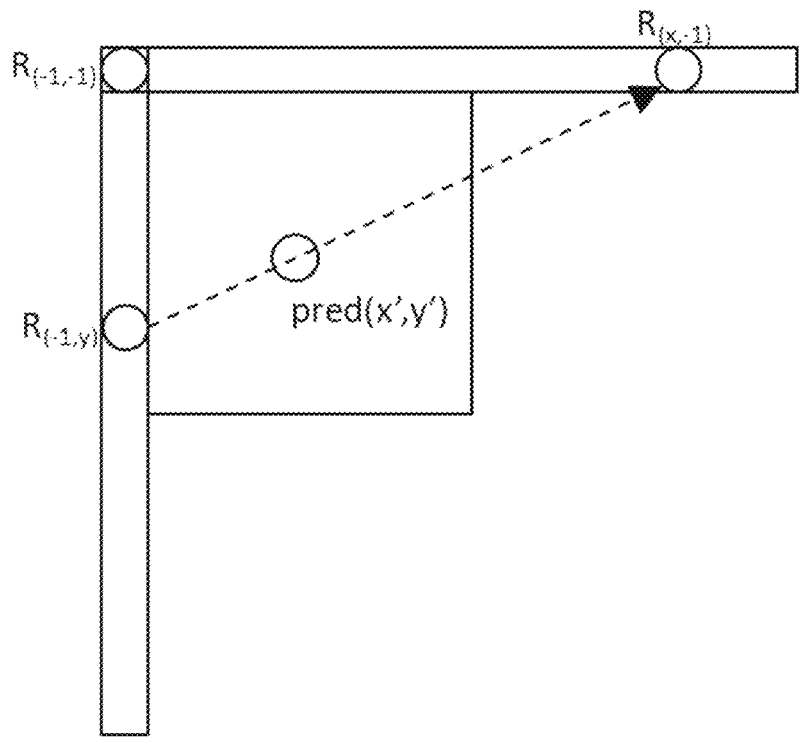
Figure 5D:
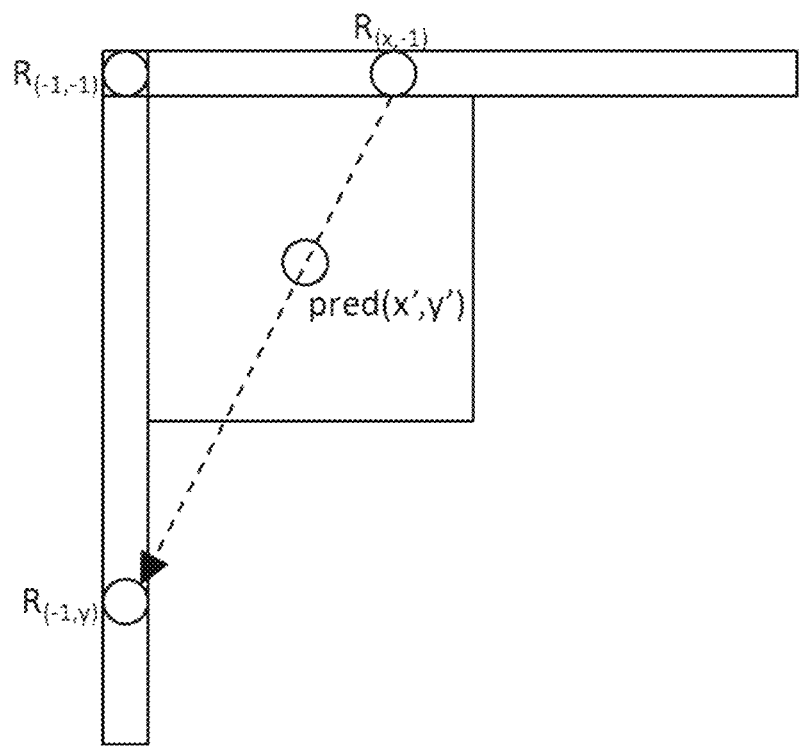

As shown in FIG. 4, two vertically-adjacent predicted samples may use two non-adjacent reference samples in the case of wide-angle intra prediction. Hence, low-pass reference samples filter and side smoothing are applied to the wide-angle prediction to reduce the negative effect of the increased gap $\Delta p_\alpha$.

2.5 Examples of Position Dependent Intra Prediction Combination (PDPC)

In the VTM2, the results of intra prediction of planar mode are further modified by a position dependent intra prediction combination (PDPC) method. PDPC is an intra prediction method which invokes a combination of the un-filtered boundary reference samples and HEVC style intra prediction with filtered boundary reference samples. PDPC is applied to the following intra modes without signaling: planar, DC, horizontal, vertical, bottom-left angular mode and its eight adjacent angular modes, and top-right angular mode and its eight adjacent angular modes.

The prediction sample pred(x,y) is predicted using an intra prediction mode (DC, planar, angular) and a linear combination of reference samples according to the Equation as follows:

$$\text{pred}(x,y) = (wL \times R_{-1,y} + wT \times R_{x,-1} - wTL \times R_{-1,-1} + (64 - wL - wT + wTL) \times \text{pred}(x,y) + 32) >> \text{shift}$$

Herein, $R_{x,-1}$, $R_{-1,y}$ represent the reference samples located at the top and left of current sample (x, y), respectively, and $R_{-1,-1}$ represents the reference sample located at the top-left corner of the current block.

In some embodiments, and if PDPC is applied to DC, planar, horizontal, and vertical intra modes, additional boundary filters are not needed, as required in the case of HEVC DC mode boundary filter or horizontal/vertical mode edge filters.

FIGS. 5A-5D illustrate the definition of reference samples ($R_{x,-1}$, $R_{-1,y}$ and $R_{-1,-1}$) for PDPC applied over various prediction modes. The prediction sample pred (x', y') is located at (x', y') within the prediction block. The coordinate x of the reference sample $R_{x,-1}$ is given by: x=x'+y'+1, and the coordinate y of the reference sample $R_{-1,y}$ is similarly given by: y=x'+y'+1.

In some embodiments, the PDPC weights are dependent on prediction modes and are shown in Table 2, where S=shift.

TABLE 2

Examples of PDPC weights according to prediction modes

| Prediction modes | wT | wL | wTL |
|---|---|---|---|
| Diagonal top-right | 16 >> ((y' << 1) >> S) | 16 >> ((x' << 1) >> S) | 0 |
| Diagonal bottom-left | 16 >> ((y' << 1) >> S) | 16 >> ((x' << 1) >> S) | 0 |
| Adjacent diag. top-right | 32 >> ((y' << 1) >> S) | 0 | 0 |
| Adjacent diag. bottom-left | 0 | 32 >> ((x' << 1) >> S) | 0 |

2.6 Intra Subblock Partitioning

Figure 6:
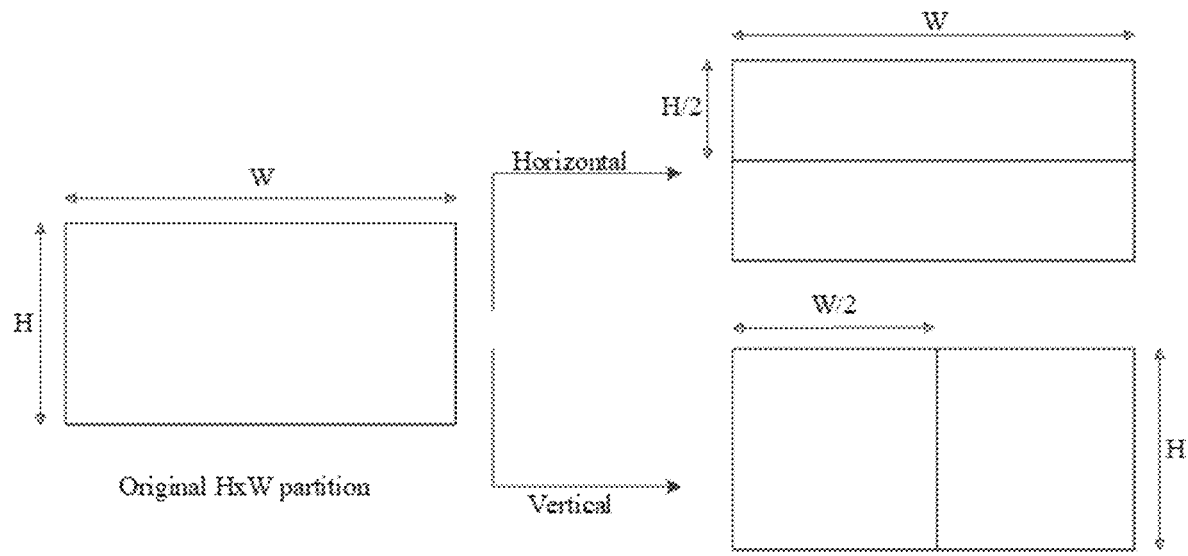
FIG. 6 shows an example of divisions of 4×8 and 8×4 blocks.
Figure 7:
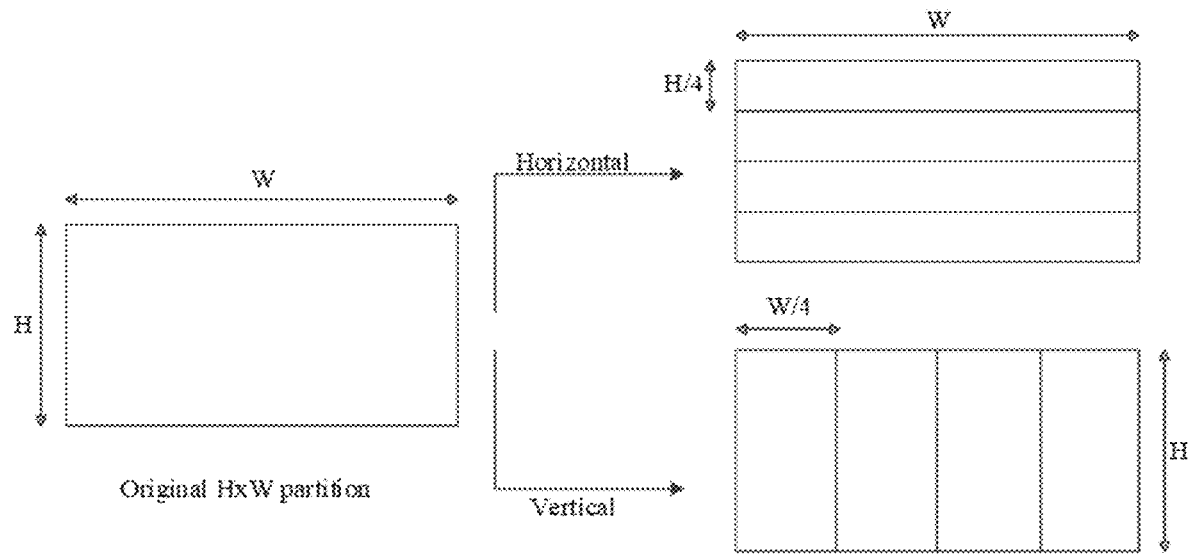
FIG. 7 shows an example of divisions all blocks except 4×8, 8×4 and 4×4.

In JVET-M0102, ISP is proposed, which divides luma intra-predicted blocks vertically or horizontally into 2 or 4 sub-partitions depending on the block size dimensions, as shown in Table 3. FIG. 6 and FIG. 7 show examples of the two possibilities. All sub-partitions fulfill the condition of having at least 16 samples.

TABLE 3

Number of sub-partitions depending on the block size

| Block Size | Number of Sub-Partitions |
| --- | --- |
| 4 × 4 | Not divided |
| 4 × 8 and 8 × 4 | 2 |
| All other cases | 4 |

For each of these sub-partitions, a residual signal is generated by entropy decoding the coefficients sent by the encoder and then invert quantizing and invert transforming them. Then, the sub-partition is intra predicted and finally the corresponding reconstructed samples are obtained by adding the residual signal to the prediction signal. Therefore, the reconstructed values of each sub-partition will be available to generate the prediction of the next one, which will repeat the process and so on. All sub-partitions share the same intra mode.

Based on the intra mode and the split utilized, two different classes of processing orders are used, which are referred to as normal and reversed order. In the normal order, the first sub-partition to be processed is the one containing the top-left sample of the CU and then continuing downwards (horizontal split) or rightwards (vertical split). As a result, reference samples used to generate the sub-partitions prediction signals are only located at the left and above sides of the lines. On the other hand, the reverse processing order either starts with the sub-partition containing the bottom-left sample of the CU and continues upwards or starts with sub-partition containing the top-right sample of the CU and continues leftwards.

2.7 Block Differential Pulse-Code Modulation Coding (BDPCM)

BDPCM is proposed in JVET-M0057. Due to the shape of the horizontal (resp. vertical) predictors, which use the left (A) (resp. top (B)) pixel for prediction of the current pixel, the most throughput-efficient way of processing the block is to process all the pixels of one column (resp. line) in parallel, and to process these columns (resp. lines) sequentially. In order to increase throughput, we introduce the following process: a block of width 4 is divided into two halves with a horizontal frontier when the predictor chosen on this block is vertical, and a block of height 4 is divided into two halves with a vertical frontier when the predictor chosen on this block is horizontal.

Figure 8:
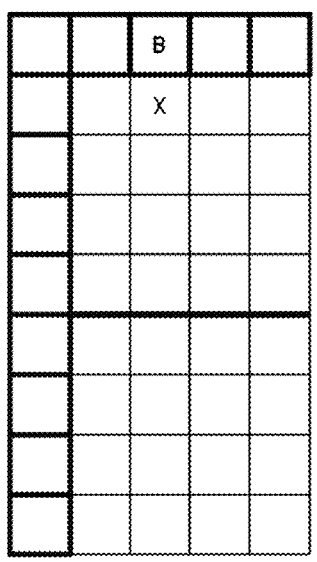
FIG. 8 shows an example of dividing a block of 4×8 samples into two independently decodable areas.
Figure 8:
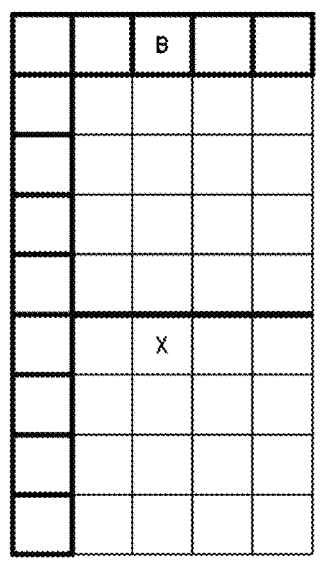
Figure 8:
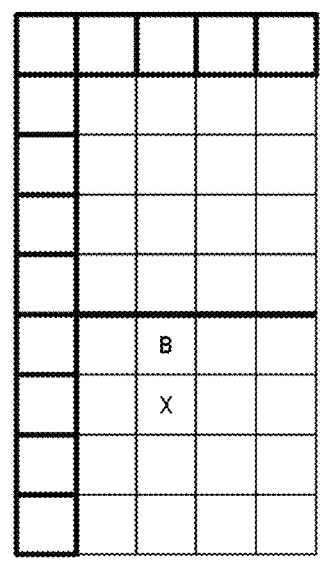

When a block is divided, samples from one area are not allowed to use pixels from another area to compute the prediction: if this situation occurs, the prediction pixel is replaced by the reference pixel in the prediction direction. This is shown on FIG. 8 for different positions of current pixel X in a 4×8 block predicted vertically.

Figure 9:
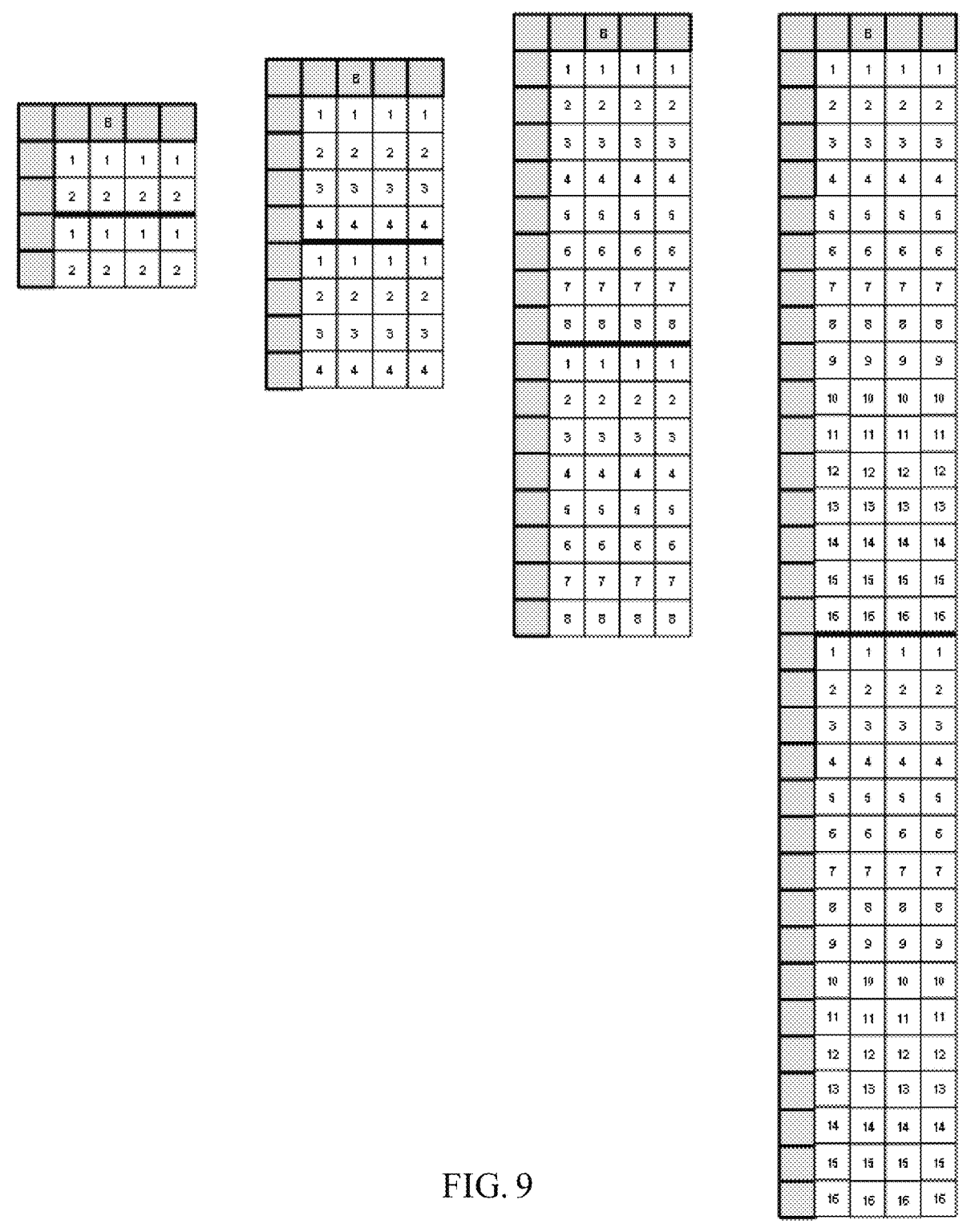

Because of this property, it becomes now possible to process a 4×4 block in 2 cycles, and a 4×8 or 8×4 block in 4 cycles, and so on, as shown on FIG. 9.

Table 4 summarizes the number of cycles required to process the block, depending on the block size. It is trivial to show that any block which has both dimensions larger or equal to 8 can be processed in 8 pixels per cycle or more.

TABLE 4

| | Throughput for blocks of size 4 × N, N × 4 | | | |
| --- | --- | --- | --- | --- |
| Block size | 4 × 4 | 4 × 8, 8 × 4 | 4 × 16, 16 × 4 | 4 × 32, 32 × 4 |
| Cycles | 2 | 4 | 8 | 16 |
| Pixels | 16 | 32 | 64 | 128 |
| Throughput (pixels/cycle) | 8 | 8 | 8 | 8 |

2.8 Quantized Residual Domain BDPCM

In JVET-N0413, quantized residual domain BDPCM (denote as RBDPCM hereinafter) is proposed. The intra prediction is done on the entire block by sample copying in prediction direction (horizontal or vertical prediction) similar to intra prediction. The residual is quantized and the delta between the quantized residual and its predictor (horizontal or vertical) quantized value is coded.

For a block of size M (rows)×N (cols), let $r_{i,j}$, $0 \leq i \leq M-1$, $0 \leq j \leq N-1$. be the prediction residual after performing intra prediction horizontally (copying left neighbor pixel value across the the predicted block line by line) or vertically (copying top neighbor line to each line in the predicted block) using unfiltered samples from above or left block boundary samples. Let $Q(r_{i,j})$, $0 \leq i \leq M-1$, $0 \leq j \leq N-1$ denote the quantized version of the residual $r_{i,j}$, where residual is difference between original block and the predicted block values. Then the block DPCM is applied to the quantized residual samples, resulting in modified M×N array $\tilde{R}$ with elements $\tilde{r}_{i,j}$. When vertical BDPCM is signaled:

$$\tilde{r}_{i,j} = \begin{cases} Q(r_{i,j}), & i = 0, 0 \leq j \leq (N-1) \\ Q(r_{i,j}) - Q(r_{(i-1),j}), & 1 \leq i \leq (M-1), 0 \leq j \leq (N-1) \end{cases}$$

For horizontal prediction, similar rules apply, and the residual quantized samples are obtained by $$\tilde{r}_{i,j} = \begin{cases} Q(r_{i,j}), & 0 \leq i \leq (M-1), j = 0 \\ Q(r_{i,j}) - Q(r_{i,(j-1)}), & 0 \leq i \leq (M-1), 1 \leq j \leq (N-1) \end{cases}$$

The residual quantized samples $\tilde{r}_{i,j}$ are sent to the decoder.

On the decoder side, the above calculations are reversed to produce $Q(r_{i,j})$, $0 \leq i \leq M-1$, $0 \leq j \leq N-1$. For vertical prediction case, $$Q(r_{i,j}) = \sum_{k=0}^{i} \tilde{r}_{k,j}, \quad 0 \leq i \leq (M-1), \; 0 \leq j \leq (N-1)$$

For horizontal case, $$Q(r_{i,j}) = \sum_{k=0}^{j} \tilde{r}_{i,k}, \quad 0 \leq i \leq (M-1), \; 0 \leq j \leq (N-1)$$

The invert quantized residuals, $Q^{-1}(Q(r_{i,j}))$, are added to the intra block prediction values to produce the reconstructed sample values.

One of the benefits of this scheme is that inverting the DPCM can be done on the fly during coefficient parsing simply adding the predictor as the coefficients are parsed or it can be performed after parsing.

Transform skip is always used in quantized residual domain BDPCM.

2.9 Multiple Transform Set (MTS) in VVC

In VTM4, large block-size transforms, up to 64×64 in size, are enabled, which is primarily useful for higher resolution video, e.g., 1080p and 4K sequences. High frequency transform coefficients are zeroed out for the transform blocks with size (width or height, or both width and height) equal to 64, so that only the lower-frequency coefficients are retained. For example, for an M×N transform block, with M as the block width and N as the block height, when M is equal to 64, only the left 32 columns of transform coefficients are kept. Similarly, when N is equal to 64, only the top 32 rows of transform coefficients are kept. When transform skip mode is used for a large block, the entire block is used without zeroing out any values.

In addition to DCT-II which has been employed in HEVC, a Multiple Transform Selection (MTS) scheme is used for residual coding both inter and intra coded blocks. It uses multiple selected transforms from the DCT8/DST7. The newly introduced transform matrices are DST-VII and DCT-VIII. The Table 4 below shows the basis functions of the selected DST/DCT.

TABLE 4

Basis functions of transform matrices used in VVC

| Transform Type | Basis function $T_i(j)$, $i, j = 0, 1, \ldots, N-1$ |
| --- | --- |
| DCT-II | $T_i(j) = \omega_0 \cdot \sqrt{\dfrac{2}{N}} \cdot \cos\left(\dfrac{\pi \cdot i \cdot (2j+1)}{2N}\right)$ where $\omega_0 = \begin{cases} \sqrt{\dfrac{2}{N}} & i = 0 \\ 1 & i \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

In order to keep the orthogonality of the transform matrix, the transform matrices are quantized more accurately than the transform matrices in HEVC. To keep the intermediate values of the transformed coefficients within the 16-bit range, after horizontal and after vertical transform, all the coefficients are to have 10-bit.

In order to control MTS scheme, separate enabling flags are specified at SPS level for intra and inter, respectively. When MTS is enabled at SPS, a CU level flag is signalled to indicate whether MTS is applied or not. Here, MTS is applied only for luma. The MTS CU level flag is signalled when the following conditions are satisfied.

Both width and height smaller than or equal to 32
CBF flag is equal to one

If MTS CU flag is equal to zero, then DCT2 is applied in both directions. However, if MTS CU flag is equal to one, then two other flags are additionally signalled to indicate the transform type for the horizontal and vertical directions, respectively. Transform and signalling mapping table as shown in Table 5. When it comes to transform matrix precision, 8-bit primary transform cores are used. Therefore, all the transform cores used in HEVC are kept as the same, including 4-point DCT-2 and DST-7, 8-point, 16-point and 32-point DCT-2. Also, other transform cores including 64-point DCT-2, 4-point DCT-8, 8-point, 16-point, 32-point DST-7 and DCT-8, use 8-bit primary transform cores.

| | | | Intra/inter | |
| --- | --- | --- | --- | --- |
| MTS_CU_flag | MTS_Hor_flag | MTS_Ver_flag | Horizontal | Vertical |
| 0 | | | DCT2 | |
| 1 | 0 | 0 | DST7 | DST7 |
| | 0 | 1 | DCT8 | DST7 |
| | 1 | 0 | DST7 | DCT8 |
| | 1 | 1 | DCT8 | DCT8 |

To reduce the complexity of large size DST-7 and DCT-8, High frequency transform coefficients are zeroed out for the DST-7 and DCT-8 blocks with size (width or height, or both width and height) equal to 32. Only the coefficients within the 16×16 lower-frequency region are retained.

As in HEVC, the residual of a block can be coded with transform skip mode. To avoid the redundancy of syntax coding, the transform skip flag is not signalled when the CU level MTS_CU_flag is not equal to zero. The block size limitation for transform skip is the same to that for MTS in JEM4, which indicate that transform skip is applicable for a CU when both block width and height are equal to or less than 32.

Implicit MTS is a recent tool in VVC. The variable implicitMtsEnabled is derived as follows:
If sps_mts_enabled_flag is equal to 1 and one of the following conditions is true, implicitMtsEnabled is set equal to 1:
IntraSubPartitionsSplitType is not equal to ISP_NO_SPLIT
cu_sbt_flag is equal to 1 and Max(nTbW, nTbH) is less than or equal to 32
sps_explicit_mts_intra_enabled_flag is equal to 0 and CuPredMode[0][xTbY][yTbY] is equal to MODE_INTRA and lfnst_idx[x0][y0] is equal to 0 and intra_mip_flag[x0][y0] is equal to 0
Otherwise, implicitMtsEnabled is set equal to 0.

In VVC Draft v6, if the current coding block is luma component and implicitMtsEnabled is equal to 1, the implicit MTS transform selection is decided by the following formula:

$$trTypeHor=(nTbW>=4 \;\&\&\; nTbW<=16)?DST7: DCT2 \qquad (8\text{-}965)$$

$$trTypeVer=(nTbH>=4 \;\&\&\; nTbH<=16)?DST7:DCT2 \qquad (8\text{-}966)$$

where trTypeHor and trTypeVer specify the horizontal and vertical transform kernels, and nTbW and nTbH specify the width and height of the transform block. The two formulas indicate that the implicit MTS transform is selected from the following pairs: {DST7, DST7}, {DST7, DCT2}, {DCT2, DST7}, {DCT2, DCT2}

2.10 Reduced Secondary Transform (RST) Proposed in JVET-N0193

2.10.1 Non-Separable Secondary Transform (NSST) in JEM

Figure 10:
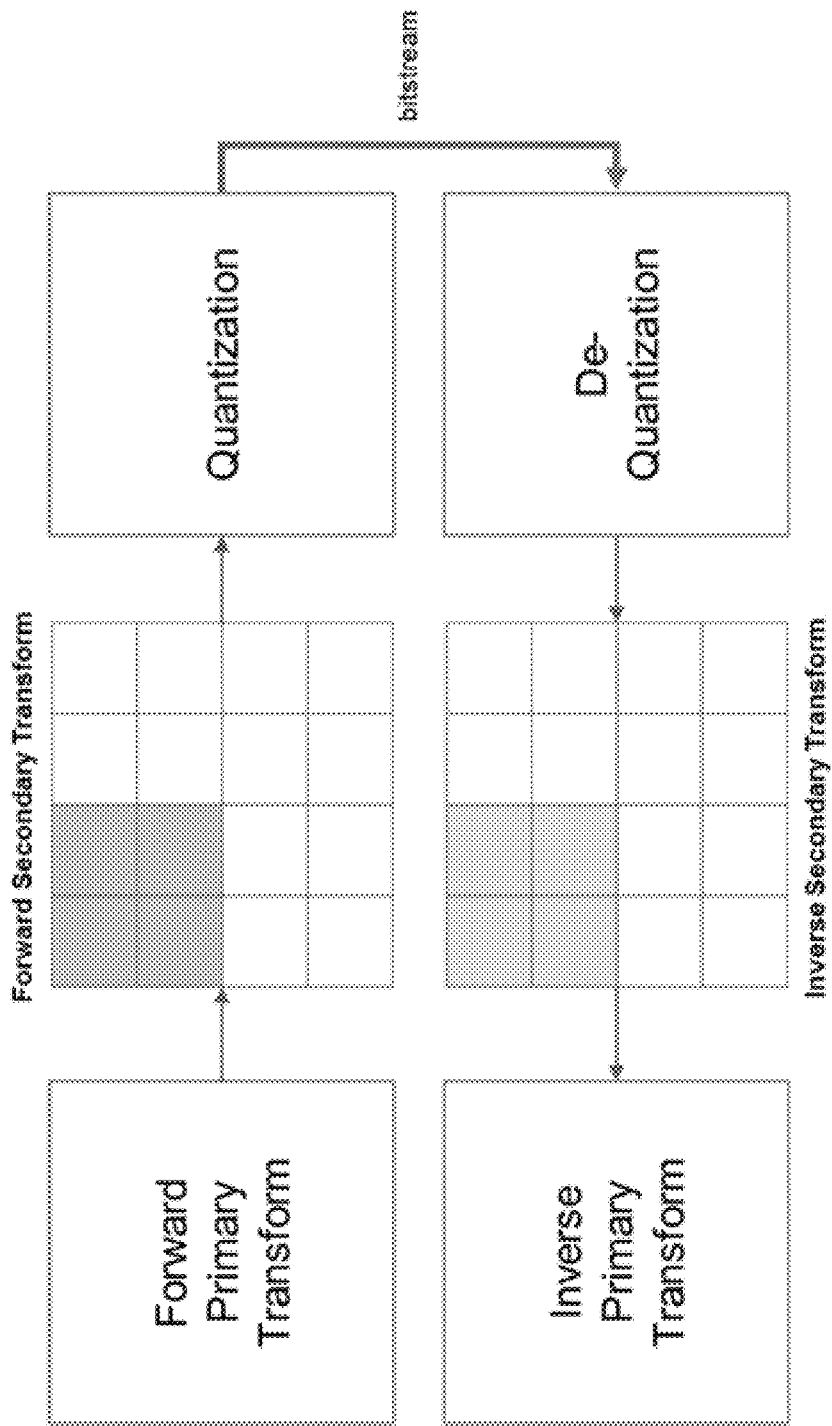
FIG. 10 shows an example of a secondary transform in JEM.

In JEM, secondary transform is applied between forward primary transform and quantization (at encoder) and between de-quantization and invert primary transform (at decoder side). As shown in FIG. 10, 4×4 (or 8×8) secondary transform is performed depends on block size. For example, 4×4 secondary transform is applied for small blocks (i.e., min (width, height)<8) and 8×8 secondary transform is applied for larger blocks (i.e., min (width, height)>4) per 8×8 block.

Application of a non-separable transform is described as follows using input as an example. To apply the non-separable transform, the 4×4 input block X $$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix}$$

is first represented as a vector $\vec{X}$:

$$\vec{X} = [X_{00}\ X_{01}\ X_{02}\ X_{03}\ X_{10}\ X_{11}\ X_{12}\ X_{13}\ X_{20}\ X_{21}\ X_{22}\ X_{23}\ X_{30}\ X_{31}\ X_{32}\ X_{33}]^T$$

The non-separable transform is calculated as $\vec{F} = T \cdot \vec{X}$, where $\vec{F}$ indicates the transform coefficient vector, and T is a 16×16 transform matrix. The 16×1 coefficient vector $\vec{F}$ is subsequently re-organized as 4×4 block using the scanning order for that block (horizontal, vertical or diagonal). The coefficients with smaller index will be placed with the smaller scanning index in the 4×4 coefficient block. There are totally 35 transform sets and 3 non-separable transform matrices (kernels) per transform set are used. The mapping from the intra prediction mode to the transform set is pre-defined. For each transform set, the selected non-separable secondary transform (NSST) candidate is further specified by the explicitly signalled secondary transform index. The index is signalled in a bit-stream once per Intra CU after transform coefficients.

2.10.2 Reduced Secondary Transform (RST) in JVET-N0193

Figure 11:
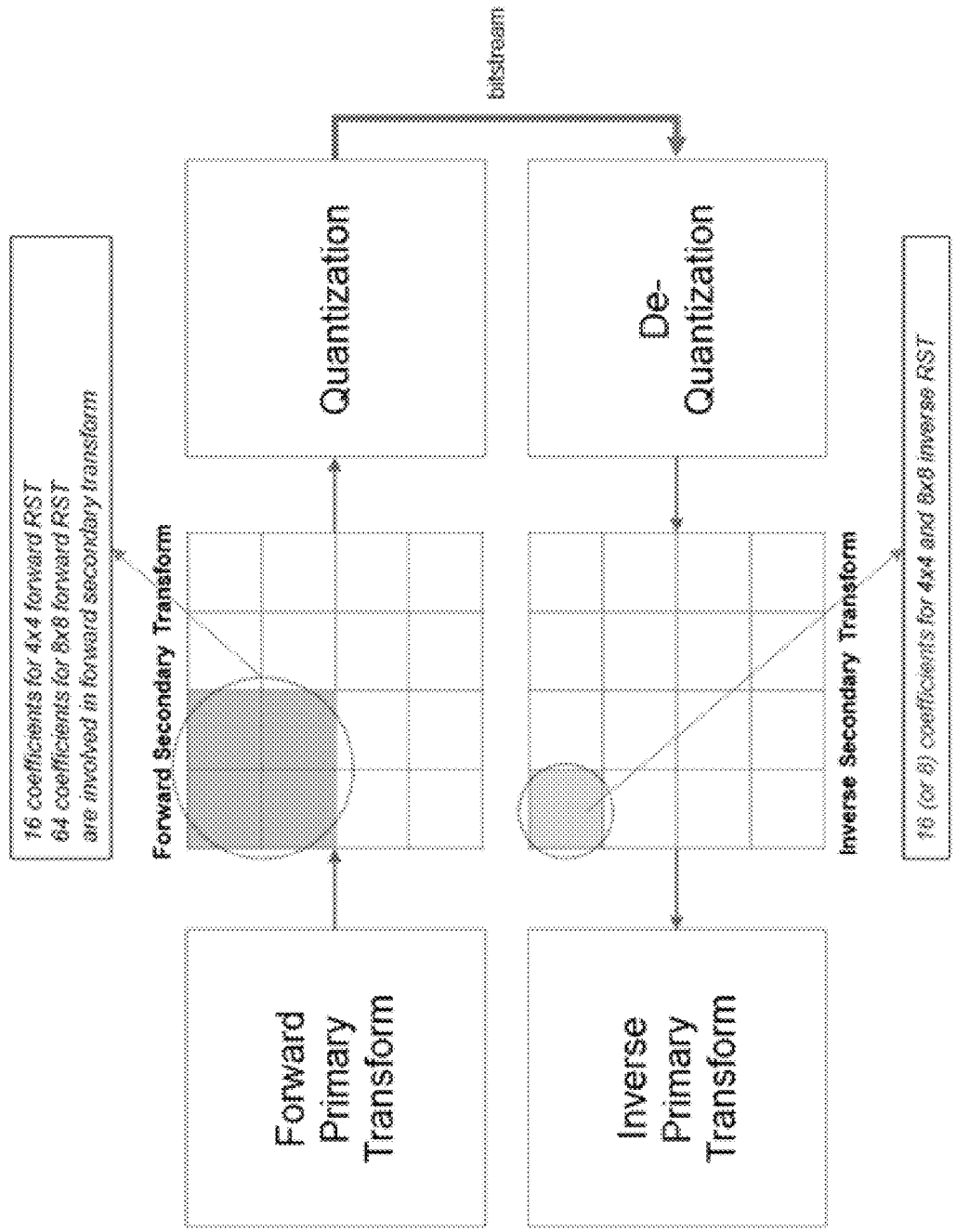
FIG. 11 shows an example of the proposed reduced secondary transform (RST).

The RST (a.k.a. Low Frequency Non-Separable Transform (LFNST)) was introduced in JVET-K0099 and 4 transform set (instead of 35 transform sets) mapping introduced in JVET-L0133. In this JVET-N0193, 16×64 (further reduced to 16×48) and 16×16 matrices are employed. For notational convenience, the 16×64 (reduced to 16×48) transform is denoted as RST8×8 and the 16×16 one as RST4×4. FIG. 11 shows an example of RST.

RST Computation

The main idea of a Reduced Transform (RT) is to map an N dimensional vector to an R dimensional vector in a different space, where R/N (R<N) is the reduction factor.

Figure 12:
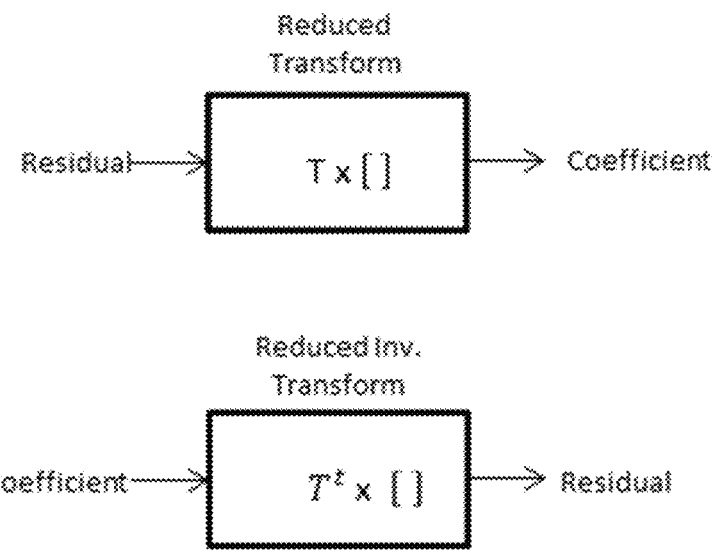
FIG. 12 shows examples of the forward and inverse reduced transforms.

The RT matrix is an R×N matrix as follows:

$$T_{R \times N} = \begin{bmatrix} t_{11} & t_{12} & t_{13} & \cdots & t_{1N} \\ t_{21} & t_{22} & t_{23} & & t_{2N} \\ \vdots & & & \ddots & \vdots \\ t_{R1} & t_{R2} & t_{R3} & \cdots & t_{RN} \end{bmatrix}$$

where the R rows of the transform are R bases of the N dimensional space. The invert transform matrix for RT is the transpose of its forward transform. The forward and invert RT are depicted in FIG. 12.

In this contribution, the RST8×8 with a reduction factor of 4 (¼ size) is applied. Hence, instead of 64×64, which is conventional 8×8 non-separable transform matrix size, 16×64 direct matrix is used. In other words, the 64×16 invert RST matrix is used at the decoder side to generate core (primary) transform coefficients in 8×8 top-left regions. The forward RST8×8 uses 16×64 (or 8×64 for 8×8 block) matrices so that it produces non-zero coefficients only in the top-left 4×4 region within the given 8×8 region. In other words, if RST is applied then the 8×8 region except the top-left 4×4 region will have only zero coefficients. For RST4×4, 16×16 (or 8×16 for 4×4 block) direct matrix multiplication is applied.

An invert RST is conditionally applied when the following two conditions are satisfied:

Block size is greater than or equal to the given threshold (W>=4 && H>=4)

Transform skip mode flag is equal to zero

If both width (W) and height (H) of a transform coefficient block is greater than 4, then the RST8×8 is applied to the top-left 8×8 region of the transform coefficient block. Otherwise, the RST4×4 is applied on the top-left min(8, W)×min(8, H) region of the transform coefficient block.

If RST index is equal to 0, RST is not applied. Otherwise, RST is applied, of which kernel is chosen with the RST index. The RST selection method and coding of the RST index are explained later.

Furthermore, RST is applied for intra CU in both intra and inter slices, and for both Luma and Chroma. If a dual tree is enabled, RST indices for Luma and Chroma are signaled separately. For inter slice (the dual tree is disabled), a single RST index is signaled and used for both Luma and Chroma.

In 13$^{th}$ JVET meeting, Intra Sub-Partitions (ISP), as a new intra prediction mode, was adopted. When ISP mode is selected, RST is disabled and RST index is not signaled, because performance improvement was marginal even if RST is applied to every feasible partition block. Furthermore, disabling RST for ISP-predicted residual could reduce encoding complexity.

RST Selection

A RST matrix is chosen from four transform sets, each of which consists of two transforms. Which transform set is applied is determined from intra prediction mode as the following:

(1) If one of three CCLM modes is indicated, transform set 0 is selected.

(2) Otherwise, transform set selection is performed according to the following table:

| The transform set selection table | |
|---|---|
| IntraPredMode | Tr. set index |
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode | 1 |

The index to access the above table, denoted as IntraPredMode, have a range of [−14, 83], which is a transformed mode index used for wide angle intra prediction.

RST Matrices of Reduced Dimension

Figure 13:
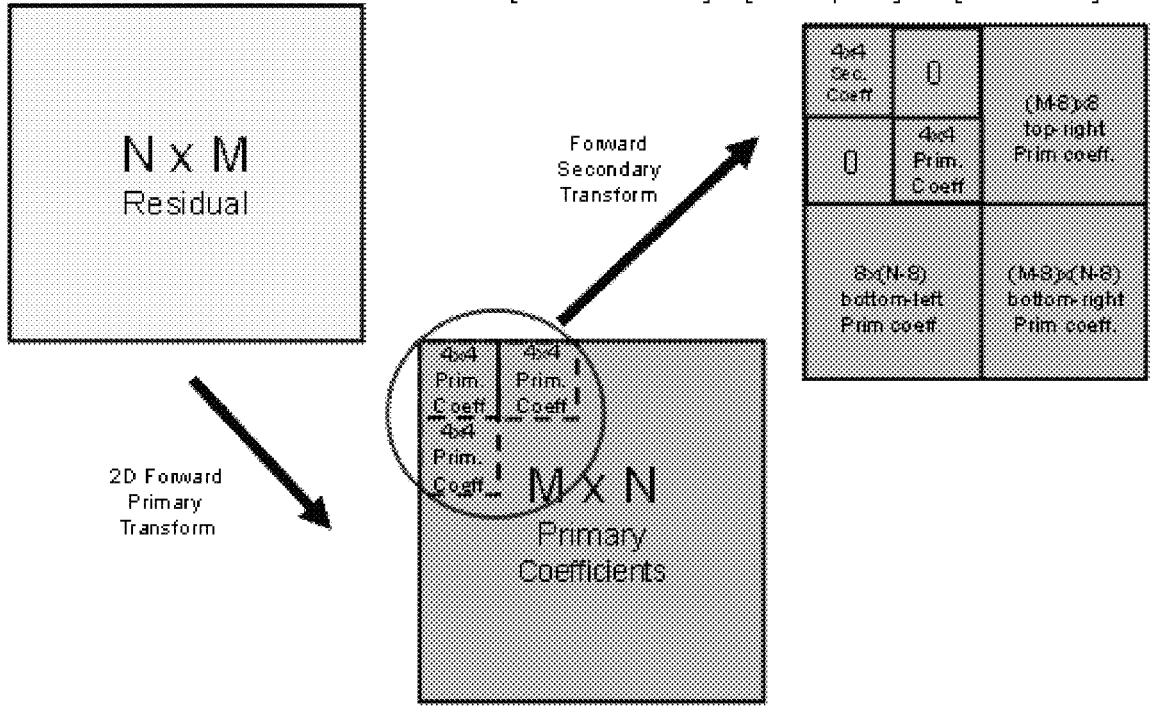
FIG. 13 shows an example of a forward RST 8×8 process with a 16×48 matrix.

As a further simplification, 16×48 matrices are applied instead of 16×64 with the same transform set configuration, each of which takes 48 input data from three 4×4 blocks in a top-left 8×8 block excluding right-bottom 4×4 block (as shown in FIG. 13).

RST Signaling

Figure 14:
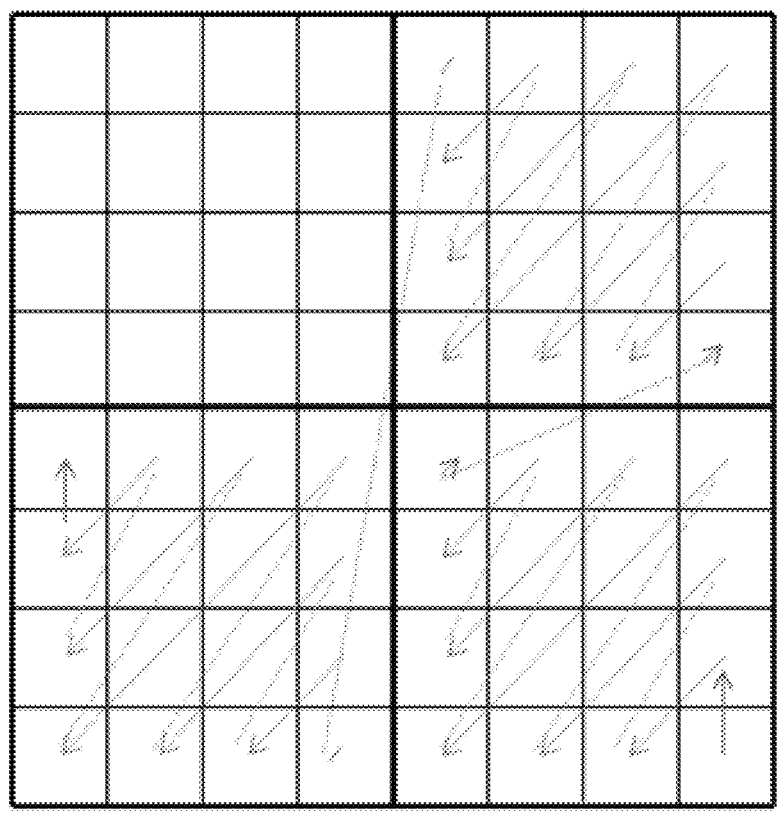
FIG. 14 shows an example of scanning positions 17 through 64 in an 8×8 block for a non-zero element.

The forward RST8×8 with R=16 uses 16×64 matrices so that it produces non-zero coefficients only in the top-left 4×4 region within the given 8×8 region. In other words, if RST is applied then the 8×8 region except the top-left 4×4 region generates only zero coefficients. As a result, RST index is not coded when any non-zero element is detected within 8×8 block region other than top-left 4×4 (which is depicted in FIG. 14) because it implies that RST was not applied. In such a case, RST index is inferred to be zero.

Zero-Out Range

Usually, before applying the invert RST on a 4×4 sub-block, any coefficient in the 4×4 sub-block may be non-zero. However, it is constrained that in some cases, some coefficients in the 4×4 sub-block must be zero before invert RST is applied on the sub-block.

Let nonZeroSize be a variable. It is required that any coefficient with the index no smaller than nonZeroSize when it is rearranged into a 1-D array before the invert RST must be zero.

When nonZeroSize is equal to 16, there is no zero-out constrain on the coefficients in the top-left 4×4 sub-block.

In JVET-N0193, when the current block size is 4×4 or 8×8, nonZeroSize is set equal to 8 (that is, coefficients with the scanning index in the range [8, 15] as show in FIG. 14, shall be 0). For other block dimensions, nonZeroSize is set equal to 16.

Description of RST in Working Draft

Sequence Parameter Set RBSP Syntax

|  | Descriptor |
|---|---|
| seq_parameter_set_rbsp( ) { | |
| ...... | |
| sps_mts_enabled_flag | u(1) |
| if( sps_mts_enabled_flag ) { | |
|     sps_explicit_mts_intra_enabled_flag | u(1) |
|     sps_explicit_mts_inter_enabled_flag | u(1) |
| } | |
| ...... | |
| sps_st_enabled_flag | u(1) |
| ...... | |
| } | |

Residual Coding Syntax

|  | Descriptor |
|---|---|
| residual_coding( x0, y0, log2TbWidth, log2TbHeight, cIdx ) { | |
| ... | |
|   if( coded_sub_block_flag[ xS ][ yS ] && ( n > 0 \|\| !inferSbDcSigCoeffFlag ) && | |
|     ( xC != LastSignificantCoeffX \|\| yC != LastSignificantCoeffY ) ) { | |
|     sig_coeff_flag[ xC ][ yC ] | ae(v) |
|     remBinsPass1−− | |
|     if( sig_coeff_flag[ xC ][ yC ] ) | |
|       inferSbDcSigCoeffFlag = 0 | |
|   } | |
|   if( sig_coeff_flag[ xC ][ yC ] ) { | |
|     if( !transform_skip_flag[ x0 ][ y0 ] ) { | |
|     numSigCoeff++ | |
|     if( ( ( ( log2TbWidth == 2 && log2TbHeight == 2 ) \|\| ( log2TbWidth == 3 && log2TbHeight == 3 ) ) && n >= 8 && i == 0 ) \|\| ( ( log2TbWidth >= 3 && log2TbHeight >= 3 && ( i == 1 \|\| i == 2 ) ) ) ) { | |
|       numZeroOutSigCoeff++ | |
|     } | |
|   } | |
|   abs_level_gt1_flag[ n ] | ae(v) |
| ... | |

Coding Unit Syntax

|  | Descriptor |
|---|---|
| coding_unit( x0, y0, cbWidth, cbHeight, treeType ) { | |
| ... | |
|   if( !pcm_flag[ x0 ][ y0 ] ) { | |
|     if( CuPredMode[ x0 ][ y0 ] != MODE_INTRA && merge_flag[ x0 ][ y0 ] == 0 ) | |
|       cu_cbf | ae(v) |
|     if( cu_cbf ) { | |
|       if( CuPredMode[ x0 ][ y0 ] == MODE_INTER && sps_sbt_enabled_flag && !ciip_flag[ x0 ][ y0 ] ) { | |
|         if( cbWidth <= MaxSbtSize && cbHeight <= MaxSbtSize ) { | |
|           allowSbtVerH = cbWidth >= 8 | |
|           allowSbtVerQ = cbWidth >= 16 | |
|           allowSbtHorH = cbHeight >= 8 | |
|           allowSbtHorQ = cbHeight >= 16 | |
|           if( allowSbtVerH \|\| allowSbtHorH \|\| allowSbtVerQ \|\| allowSbtHorQ ) | |

| | Descriptor |
|---|---|
|             cu_sbt_flag | ae(v) |
|         } | |
|         if( cu_sbt_flag ) { | |
|             if( ( allowSbtVerH \|\| allowSbtHorH ) && ( allowSbtVerQ \|\| allowSbtHorQ) ) | |
|                 cu_sbt_quad_flag | ae(v) |
|             if( ( cu_sbt_quad_flag && allowSbtVerQ && allowSbtHorQ ) \|\| | |
|                 ( !cu_sbt_quad_flag && allowSbtVerH && allowSbtHorH ) ) | |
|                 cu_sbt_horizontal_flag | ae(v) |
|             cu_sbt_pos_flag | ae(v) |
|         } | |
|     } | |
|     numZeroOutSigCoeff = 0 | |
|     transform_tree( x0, y0, cbWidth, cbHeight, treeType ) | |
|     if( Min( cbWidth, cbHeight ) >= 4 && sps_st_enabled_flag == 1 && CuPredMode[ x0 ][ y0 ] == MODE_INTRA && IntraSubPartitionsSplitType == ISP_NO_SPLIT ) { | |
|         if( ( numSigCoeff > ( ( treeType == SINGLE_TREE ) ? 2 : 1 ) ) && numZeroOutSigCoeff == 0 ) { | |
|             st_idx[ x0 ][ y0 ] | ae(v) |
|         } | |
|     } | |
|   } | |
| } | |

Sequence Parameter Set RBSP Semantics sps_st_enabled_flag equal to 1 specifies that st_idx may be present in the residual coding syntax for intra coding units. sps_st_enabled_flag equal to 0 specifies that st_idx is not present in the residual coding syntax for intra coding units.

Coding Unit Semantics st_idx[x0][y0] specifies which secondary transform kernel is applied between two candidate kernels in a selected transform set. st_idx[x0][y0] equal to 0 specifies that the secondary transform is not applied. The array indices x0, y0 specify the location (x0, y0) of the top-left sample of the considered transform block relative to the top-left sample of the picture. When st_idx[x0][y0] is not present, st_idx[x0][y0] is inferred to be equal to 0.

Transformation Process for Scaled Transform Coefficients

General

Inputs to this process are:
- a luma location (xTbY, yTbY) specifying the top-left sample of the current luma transform block relative to the top-left luma sample of the current picture,
- a variable nTbW specifying the width of the current transform block,
- a variable nTbH specifying the height of the current transform block,
- a variable cIdx specifying the colour component of the current block,
- an (nTbW)×(nTbH) array d[x][y] of scaled transform coefficients with x=0 . . . nTbW−1, y=0 . . . nTbH−1.

Output of this process is the (nTbW)×(nTbH) array r[x][y] of residual samples with x=0 . . . nTbW−1, y=0 . . . nTbH−1.

If st_idx[xTbY][yTbY] is not equal to 0, the following applies:

1. The variables nStSize, log 2StSize, numStX, numStY, and nonZeroSize are derived as follows:
   If both nTbW and nTbH are greater than or equal to 8, log 2StSize is set to 3 and nStOutSize is set to 48.
   Otherwise, log 2StSize is set to 2 and nStOutSize is set to 16.
   nStSize is set to (1<<log 2StSize).
   If nTbH is equal to 4 and nTbW is greater than 8, numStX set equal to 2.
   Otherwise, numStX set equal to 1.
   If nTbW is equal to 4 and nTbH is greater than 8, numStY set equal to 2.
   Otherwise, numStY set equal to 1.
   If both nTbW and nTbH are equal to 4 or both nTbW and nTbH are equal to 8, nonZeroSize is set equal to 8.
   Otherwise, nonZeroSize set equal to 16.

2. For xSbIdx=0 . . . numStX−1 and ySbIdx=0 . . . numStY−1, the following applies:
   The variable array u[x] with x=0 . . . nonZeroSize−1 are derived as follows:

$xC=(xSbIdx<<\log 2StSize)+DiagScanOrder[\log 2StSize][\log 2StSize][x][0]$ $yC=(ySbIdx<<\log 2StSize)+DiagScanOrder[\log 2StSize][\log 2StSize][x][1]$ $u[x]=d[xC][yC]$ u[x] with x=0 . . . nonZeroSize−1 is transformed to the variable array v[x] with x=0 . . . nStOutSize−1 by invoking the one-dimensional transformation process as specified in clause 8.7.4.4 with the transform input length of the scaled transform coefficients nonZeroSize, the transform output length nStOutSize the list u[x] with x=0 . . . nonZeroSize−1, the index for transform set selection stPredModeIntra, and the index for transform selection in a transform set st_idx[xTbY][yTbY] as inputs, and the output is the list v[x] with x=0 . . . nStOutSize−1. The variable stPredModeIntra is set to the predModeIntra specified in clause 8.4.4.2.1.

The array d[(xSbIdx<<log 2StSize)+x][(ySbIdx<<log 2StSize)+y] with x=0 . . . nStSize−1, y=0 . . . nStSize−1 are derived as follows:
   If stPredModeIntra is less than or equal to 34, or equal to INTRA_LT_CCLM, INTRA_T_CCLM, or INTRA_L_CCLM, the following applies:

$d[(xSbIdx<<\log 2StSize)+x][(ySbIdx<<\log 2StSize)+y]=(y<4)?v[x+(y<<\log 2StSize)]:((x<4)?v[32+x+((y-4)<<2)]:$ $d[(xSbIdx<<\log 2StSize)+x][(ySbIdx<<\log 2StSize)+y])$ Otherwise, the following applies:

$d[(xSbIdx<<\log 2StSize)+x][(ySbIdx<<\log 2StSize)+y]=(y<4)?v[y+(x<<\log 2StSize)]:((x<4)?v[32+(y-4)+(x<<2)]:$ $d[(xSbIdx<<\log 2StSize)+x][(ySbIdx<<\log 2StSize)+y])$ Secondary Transformation Process
  Inputs to this process are:
  a variable nTrS specifying the transform output length,
  a variable nonZeroSize specifying the transform input length,
  a list of transform input x[j] with j=0 ... nonZeroSize−1,
  a variable stPredModeIntra specifying the index for transform set selection,
  a variable stIdx specifying the index for transform selection in a set.
  Output of this process is the list of transformed samples y[i] with i=0 ... nTrS−1.
  The transformation matrix derivation process as specified in clause 8.7.4.5 is involved with the transform output length nTrS, the index for transform set selection stPredModeIntra, and the index for transform selection in a transform set stIdx as inputs, and the transformation matrix secTransMatrix as output.
  The list of transformed samples y[i] with i=0 ... nTrS−1 is derived as follows:

$$y[i] = Clip3\Big(CoeffMin, CoeffMax, \Big(\big(\sum_{j=0}^{nonZeroSize-1} secTransMatrix[j][i] * x[j]\big) + 64\Big) \gg 7\Big)$$

with i=0 ... nTrS−1

Coeff Min=−(1<<15) and Coeff Max=(1<<15)−1;

Secondary Transformation Matrix Derivation Process
  Inputs to this process are:
  a variable nTrS specifying the transform output length,
  a variable stPredModeIntra specifying the index for transform set selection,
  a variable stIdx specifying the index for transform selection in the designated transform set.
  Output of this process is the transformation matrix secTransMatrix.
  The variable stTrSetIdx is derived as follows:

| stPredModeIntra | stTrSetIdx |
|---|---|
| stPredModeIntra < 0 | 1 |
| 0 <= stPredModeIntra <= 1 | 0 |
| 2 <= stPredModeIntra <= 12 | 1 |
| 13 <= stPredModeIntra <= 23 | 2 |
| 24 <= stPredModeIntra <= 44 | 3 |
| 45 <= stPredModeIntra <= 55 | 2 |
| 56 <= stPredModeIntra | 1 |

The transformation matrix secTransMatrix is derived based on nTrS, stTrSetIdx, and stIdx as follows:
  If nTrS is equal to 16, stTrSetIdx is equal to 0, and stIdx is equal to 1, the following applies: secTransMatrix [m][n]= ...
  If nTrS is equal to 16, stTrSetIdx is equal to 0, and stIdx is equal to 2, the following applies: secTransMatrix [m][n]= ...
  If nTrS is equal to 16, stTrSetIdx is equal to 1, and stIdx is equal to 1, the following applies: secTransMatrix [m][n]= ...
  If nTrS is equal to 16, stTrSetIdx is equal to 1, and stIdx is equal to 2, the following applies: secTransMatrix [m][n]= ...
  If nTrS is equal to 16, stTrSetIdx is equal to 2, and stIdx is equal to 1, the following applies: secTransMatrix [m][n]= ...
  If nTrS is equal to 16, stTrSetIdx is equal to 2, and stIdx is equal to 2, the following applies: secTransMatrix [m][n]= ...
  If nTrS is equal to 16, stTrSetIdx is equal to 3, and stIdx is equal to 1, the following applies: secTransMatrix [m][n]= ...
  If nTrS is equal to 16, stTrSetIdx is equal to 3, and stIdx is equal to 2, the following applies: secTransMatrix [m][n]= ...
  If nTrS is equal to 48, stTrSetIdx is equal to 0, and stIdx is equal to 1 the following applies: secTransMatrix [m][n]= ...
  If nTrS is equal to 48, stTrSetIdx is equal to 0, and stIdx is equal to 2 the following applies: secTransMatrix [m][n]= ...
  If nTrS is equal to 48, stTrSetIdx is equal to 1, and stIdx is equal to 1 the following applies: secTransMatrix [m][n]= ...
  If nTrS is equal to 48, stTrSetIdx is equal to 1, and stIdx is equal to 2 the following applies: secTransMatrix [m][n]= ...
  If nTrS is equal to 48, stTrSetIdx is equal to 2, and stIdx is equal to 1 the following applies: secTransMatrix [m][n]= ...
  If nTrS is equal to 48, stTrSetIdx is equal to 2, and stIdx is equal to 2 the following applies: secTransMatrix [m][n]= ...
  If nTrS is equal to 48, stTrSetIdx is equal to 3, and stIdx is equal to 1 the following applies: secTransMatrix [m][n]= ...
  If nTrS is equal to 48, stTrSetIdx is equal to 3, and stIdx is equal to 2 the following applies: secTransMatrix [m][n]= ...

2.11 Clipping of Dequantization in HEVC
  In HEVC, the scaled transform coefficient d' is calculated as $d'$=Clip3(coeff Min, coeff Max, $d$), where d is the scaled transform coefficient before clipping.
  For luma component, coeff Min=Coeff Min $Y$, coeff Max=Coeff Max $Y$;

For chroma components, coeff Min=Coeff Min $C$, coeff Max=Coeff Max $C$.

Herein,

Coeff Min Y=−(1<<(extended_precision_processing_flag?Max(15, BitDepthY+6):15))

Coeff Min C=−(1<<(extended_precision_processing_flag?Max(15, BitDepth C+6):15))

Coeff Max Y=(1<<(extended_precision_processing_flag?Max(15, BitDepth Y+6):15))−1

Coeff Max C=(1<<(extended_precision_processing_flag?Max(15, BitDepth C+6):15))−1 extended_precision_processing_flag is a syntax element signaled in SPS.

2.12 Affine Linear Weighted Intra Prediction (ALWIP, or Matrix Based Intra Prediction)

Affine linear weighted intra prediction (ALWIP, or matrix based intra prediction (MIP)) is proposed in JVET-N0217.

In JVET-N0217, two tests are conducted. In test 1, ALWIP is designed with a memory restriction of 8K bytes and at most 4 multiplications per sample. Test 2 is similar to test 1, but further simplifies the design in terms of memory requirement and model architecture.

Single set of matrices and offset vectors for all block shapes.
Reduction of number of modes to 19 for all block shapes.
Reduction of memory requirement to 5760 10-bit values, that is 7.20 Kilobyte.
Linear interpolation of predicted samples is carried out in a single step per direction replacing iterative interpolation as in the first test.

2.13 Sub-Block Transform

For an inter-predicted CU with cu_cbf equal to 1, cu_sbt_flag may be signaled to indicate whether the whole residual block or a sub-part of the residual block is decoded. In the former case, inter MTS information is further parsed to determine the transform type of the CU. In the latter case, a part of the residual block is coded with inferred adaptive transform and the other part of the residual block is zeroed out. The SBT is not applied to the combined inter-intra mode.

In sub-block transform, position-dependent transform is applied on luma transform blocks in SBT-V and SBT-H (chroma TB always using DCT-2). The two positions of SBT-H and SBT-V are associated with different core transforms. More specifically, the horizontal and vertical transforms for each SBT position is specified in FIG. 15. For example, the horizontal and vertical transforms for SBT-V position 0 is DCT-8 and DST-7, respectively. When one side of the residual TU is greater than 32, the corresponding transform is set as DCT-2. Therefore, the sub-block transform jointly specifies the TU tiling, cbf, and horizontal and vertical transforms of a residual block, which may be considered a syntax shortcut for the cases that the major residual of a block is at one side of the block. 2.14 AVS-M4763: Scan Region based Coefficient Coding (SRCC)

Figure 16A:
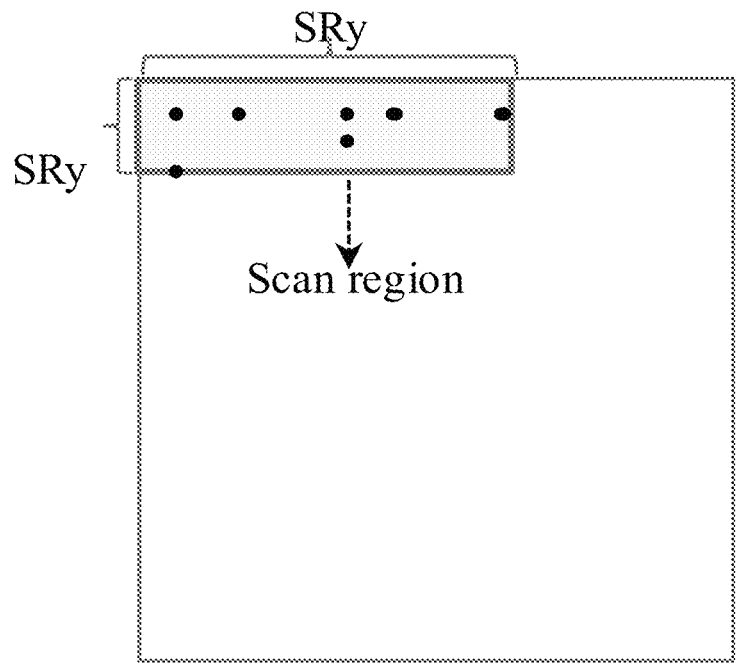
FIGS. 16A and 16B illustrate examples of scan region based coefficient coding.
Figure 16B:
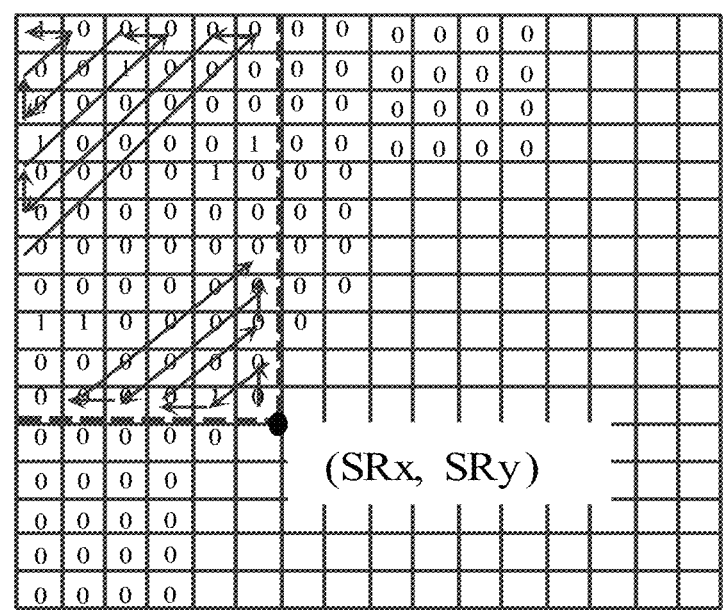

SRCC has been adopted into AVS-3. With SRCC, a bottom-right position (SRx, SRy) as shown in FIGS. 16A and 16B is signaled, and only coefficients inside a rectangle with four corners (0, 0), (SRx, 0), (0, SRy), (SRx, SRy) are scanned and signaled. All coefficients out of the rectangle are zero.

3 Examples of Drawbacks in Existing Implementations

The current design of MTS has the following problems:
The signaled index may cause overhead bits.
Some combinations of transforms may not be efficient in MTS and SBT.

The decision of implicit MTS may not be efficient. In current VVC, implicitMtsEnabled is dependent on sps_mts_enabled_flag equal to 1. However, when sps_mts_enabled_flag is equal to 0, implicitMtsEnabled may also need to be applied.

In current VVC, the transform skip (TS) flag is coded regardless whether the current block is coded with QR-BDPCM mode or not. However, when QR-BDPCM is enabled, there is no need to apply transforms. Therefore, the signaling of TS flag is redundant when one block is coded with QR-BDPCM.

In current VVC, the transform skip flag is context coded with one context which may be also utilized for coding the bin which indicates whether the transform matric is DCT2. The shared context may be less efficient.

There are 5 context coded bins using 9 contexts required to code the transform matrix indices which impacts the parsing throughput.

QR-BDPCM/TS may be also applicable to chroma blocks. How to better determine the usage of QR-BDPCM/TS need to be further studied.

4 Exemplary Methods for Multiple Transforms

Embodiments of the presently disclosed technology overcome drawbacks of existing implementations, thereby providing video coding with higher coding efficiencies but lower computational complexity. Methods for multiple transforms, and as described in the present document, may enhance both existing and future video coding standards, is elucidated in the following examples described for various implementations. The examples of the disclosed technology provided below explain general concepts, and are not meant to be interpreted as limiting. In an example, unless explicitly indicated to the contrary, the various features described in these examples may be combined.

In the following examples, it is assumed that:
Max(x, y) returns the larger one of x and y, and
Min(x, y) returns the smaller one of x and y.

Implicit MTS

It is proposed to decide the transform (horizontal and/or vertical transform) applied to one block according to decoded coefficients without receiving transform indices.

1. The decoded coefficients may be associated with one or multiple representative blocks in the same color component as the current block or different color component.
   a. In one example, the determination on the transform of a first block may depend on the decoded coefficients of the first block.
   b. In one example, the determination on the transform of a first block may depend on the decoded coefficients of a second block which may be different to the first block.
      i. In one example, the second block may be in the same color component, such as the luma component, as the color component of the first block.
         1) In one example, the second block may be neighbouring to the first block.
         2) In one example, the second block may be with the same intra prediction mode as the first block.
         3) In one example, the second block may be with the same block dimensions as the first block.
         4) In one example, the second block may be the last decoded block satisfying certain conditions, such as the same intra-prediction mode or the same dimensions, before the first block in the decoding order.

ii. In one example, the second block may be in a different color component from that of the first block.
1) In one example, the first block may be in the luma component, and the second block may be in a chroma component (e.g., the Cb/Cr, B/R component).
a) In one example, the three blocks are in the same coding unit.
b) Alternatively, furthermore, implicit MTS is applied only to the luma blocks, not to chroma blocks.
2) In one example, the first block in the first color component and the second block in the second color component may be at the corresponding locations of a picture with each other.
c. In one example, the determination on the transform of a first block may depend on the decoded coefficients of multiple blocks comprising at least one block not identical to the first block.
i. In one example, multiple blocks may comprise the first block.
ii. In one example, multiple blocks may comprise one block or plurality of neighbouring to the first block.
iii. In one example, multiple blocks may comprise one block or plurality of blocks with the same block dimensions as the first block.
iv. In one example, multiple blocks may comprise last N decoded block satisfying certain conditions, such as the same intra-prediction mode or the same dimensions, before the first block in the decoding order. N is an integer larger than 1.
v. In one example, multiple blocks may comprise one block or plurality of blocks not in the same color component as the first block.
1) In one example, the first block may be in the luma component. Multiple blocks may comprise blocks in chroma components (e.g., a second block in the Cb/B component, and a third block in the Cr/R component).
a) In one example, the three blocks are in the same coding unit.
b) Alternatively, furthermore, implicit MTS is applied only to the luma blocks, not to chroma blocks.
2) In one example, the first block in the first color component and the plurality of blocks not in the first component color component comprised in the multiple blocks may be at the corresponding locations of a picture with the first block.
2. The decoded coefficients utilized for transform determination are those unequal to zero (denoted as significant coefficients). Those coefficients utilized for transform determination are called representative coefficients.
a. In one example, representative coefficients are all the significant coefficients in representative blocks.
b. Alternatively, representative coefficients are partial of significant coefficients in representative blocks.
i. In one example, representative coefficients are those decoded significant coefficients which are larger than or no smaller than a threshold
ii. In one example, representative coefficients are those decoded significant coefficients which are smaller than or no greater than a threshold
iii. In one example, representative coefficients are the first K (K>=1) decoded significant coefficients in the decoding order.
iv. In one example, representative coefficients are the last K (K>=1) decoded significant coefficients in the decoding order.
v. In one example, representative coefficients may be those at a predefined location in a block.
1) In one example, representative coefficients may comprise only one coefficient located at (xPos, yPos) coordinate relative to the representative block. E.g. xPos=yPos=0.
2) For example, the positions may depend on the dimensions of the block.
vi. In one example, representative coefficients may be those at a predefined position in the coefficient scanning order.
c. Alternatively, representative coefficients may also comprise those zero coefficients.
d. Alternatively, representative coefficients may be those derived from decoded coefficients, such as via clipping to a range, via quantization.
3. The transform determination may depend on a function of representative coefficients, such as a function with a value V as the output, using representative coefficients as inputs.
a. In one example, V is derived as the number of representative coefficients.
i. Alternatively, V is derived as the sum of representative coefficients.
1) Alternatively, furthermore, the sum may be clipped to derive V.
ii. Alternatively, V is derived as the sum of absolute values of representative coefficients.
1) Alternatively, furthermore, the sum may be clipped to derive V.
b. In one example, the selection may be determined implicitly at the decoder depending on the parity of V.
i. For example, if V is even, a first kind of transform is selected as the horizontal transform and a second kind of transform is selected as the vertical transform; and if V is odd, a third kind of transform is selected as the horizontal transform and a forth kind of transform is selected as the vertical transform.
1) In one example, the first kind of transform is the same to the second kind of transform.
a) Alternatively, the first kind of transform is different to the second kind of transform.
2) In one example, the third kind of transform is the same to the forth kind of transform.
a) Alternatively, the third kind of transform is different to the forth kind of transform.
3) The first/second/third/forth kind of transform is a specific transform such as DCT-X or DST-Y. X may be an integer such as 2 or 8. Y may be an integer such as 7 or 8.
4) Alternatively, furthermore, at least one of the third and fourth kinds of transforms is different from the first and second kinds of transform.
a) In one example, when V is even, the first and second kinds of transforms are DCT-2 and when V is odd, the third and fourth kinds of transforms are DST-7.

b) Alternatively, when V is odd, the first and second kinds of transforms are DCT-2 and when V is even, the third and fourth kinds of transforms are DST-7.
c. In one example, if V is smaller than a threshold T1, a fifth kind of transform is selected as the horizontal transform and a sixth kind of transform is selected as the vertical transform. e.g. T1=1 or 2.
  i. Alternatively, if V is larger than a threshold T2, a fifth kind of transform is selected as the horizontal transform and a sixth kind of transform is selected as the vertical transform.
  ii. For example, the threshold may depend on the dimensions of the block.
  iii. For example, the threshold may depend on the QP.
  iv. In one example, the fifth kind of transform is the same to the sixth kind of transform.
    1) Alternatively, the fifth kind of transform is different to the sixth kind of transform.
  v. In one example, the fifth/sixth kind of transform is a specific transform such as DCT-X or DST-Y. X may be an integer such as 2 or 8. Y may be an integer such as 7 or 8.
d. In one example, the selection of transforms may depend on a combination of V and other coding information.
  i. For example, when the current picture/slice is intra-coded, if V is even, a first kind of transform is selected as the horizontal transform and a second kind of transform is selected as the vertical transform; and if V is odd, a third kind of transform is selected as the horizontal transform and a forth kind of transform is selected as the vertical transform; But when the current picture/slice is not intra-coded), if V is even, a third kind of transform is selected as the horizontal transform and a forth kind of transform is selected as the vertical transform; and if V is odd, a first kind of transform is selected as the horizontal transform and a second kind of transform is selected as the vertical transform. The four kinds of transforms may be defined as in bullet 3.b.
4. The transform determination may further depend on the coded information of current block.
  a. In one example, if current intra-coded block is in I-slice/picture, when V is even, DST-7 may be applied to current block and when V is odd, DCT-2 may be applied to current block.
  b. In one example, if current intra-coded block is in P/B-slice/picture, and V is even, DCT-2 may be applied to current block and when V is odd, DST-7 may be applied to current block.
  c. In one example, the determination may further depend on the mode information (e.g., intra or inter).
  d. In one example, the transform determination may depend on the scan region which is a smallest rectangular covering all the coefficients (e.g., as depicted in FIGS. 16A-16B).
    i. In one example, if the size of the scan region (width multiplied with height) associated with current block is larger than a given threshold, a default transform (including horizontal and vertical transform) may be utilized. Otherwise, the rules, such as defined in bullet 3 (e.g., DST-7 when V is even and DCT-2 when V is odd) may be utilized.
    ii. In one example, if the width of the scan region associated with current block is larger (or lower) than a given maximum width (e.g., 16), a default horizontal transform may be utilized. Otherwise, the rules, such as defined in bullet 3 may be utilized.
    iii. In one example, if the height of the scan region associated with current block is larger (or lower) than a given maximum height (e.g., 16), a default vertical transform may be utilized. Otherwise, the rules, such as defined in bullet 3 may be utilized.
    iv. In one example, the given size is L×K wherein L and K are integers, such as 16.
    v. In one example, default transform matrix may be DCT-2 or DST-7.
5. Transform sets which the implicit MTS may choose transforms from may be pre-defined.
  a. In one example, the horizontal and vertical transform sets may be not identical.
    i. Alternatively, the horizontal and vertical transform sets may be not identical.
  b. In one example, the transform set may include DCT-2 and DST-7.
  c. In one example, the transform set may include DCT-2, DST-7 and identify transform.
  d. In one example, the transform set may be dependent on coded information, color component, partitioning structure (e.g., dual tree/single tree; quadtree/binary tree/ternary tree/extended quadtree), slice/picture types etc. al.
    i. In one example, the transform set may be dependent on block dimension.
    ii. In one example, for intra-coded blocks, DCT-2 and DST-7 may be included.
    iii. In one example, for blocks coded with reference samples in the same picture (e.g., intra block copy), DST-7 and identity transform (i.e., without transform being applied) may be included.
6. In one example, one or multiple of the methods disclosed in bullet 1-bullet 5 can only be applied to specific blocks.
  a. For example, one or multiple of the methods disclosed in bullet 1-bullet 5 can only be applied to intra-coded blocks.
  b. For example, one or multiple of the methods disclosed in bullet 1-bullet 5 can only be applied to blocks with specific constrains on the coefficients.
    i. A rectangle with four corners (0, 0), (CRx, 0), (0, CRy), (CRx, CRy) is defined as the constrained rectangle. In one example, one or multiple of the methods disclosed in bullet 1-bullet 5 can be applied only if all coefficients out of the constrained rectangle are zero. E.g. CRx=CRy=16.
      1) For example, CRx=SRx and CRy=SRy, where (SRx, SRy) is defined in SRCC as described in section 2.14.
      2) Alternatively, furthermore, the above method is only applied when either block width or block height is greater than K.
        a) In one example, K is equal to 16.
        b) In one example, the above method is only applied when the block width is greater than K1 and K1 is equal to CRx; or when the block height is greater than K2 and K2 is equal to CRy.

7. When the proposed transform selection methods disclosed in bullet 1-bullet 5 are not applied, a default transform such as DCT2 is used.

Simplified MTS/SBT

Figure 15:
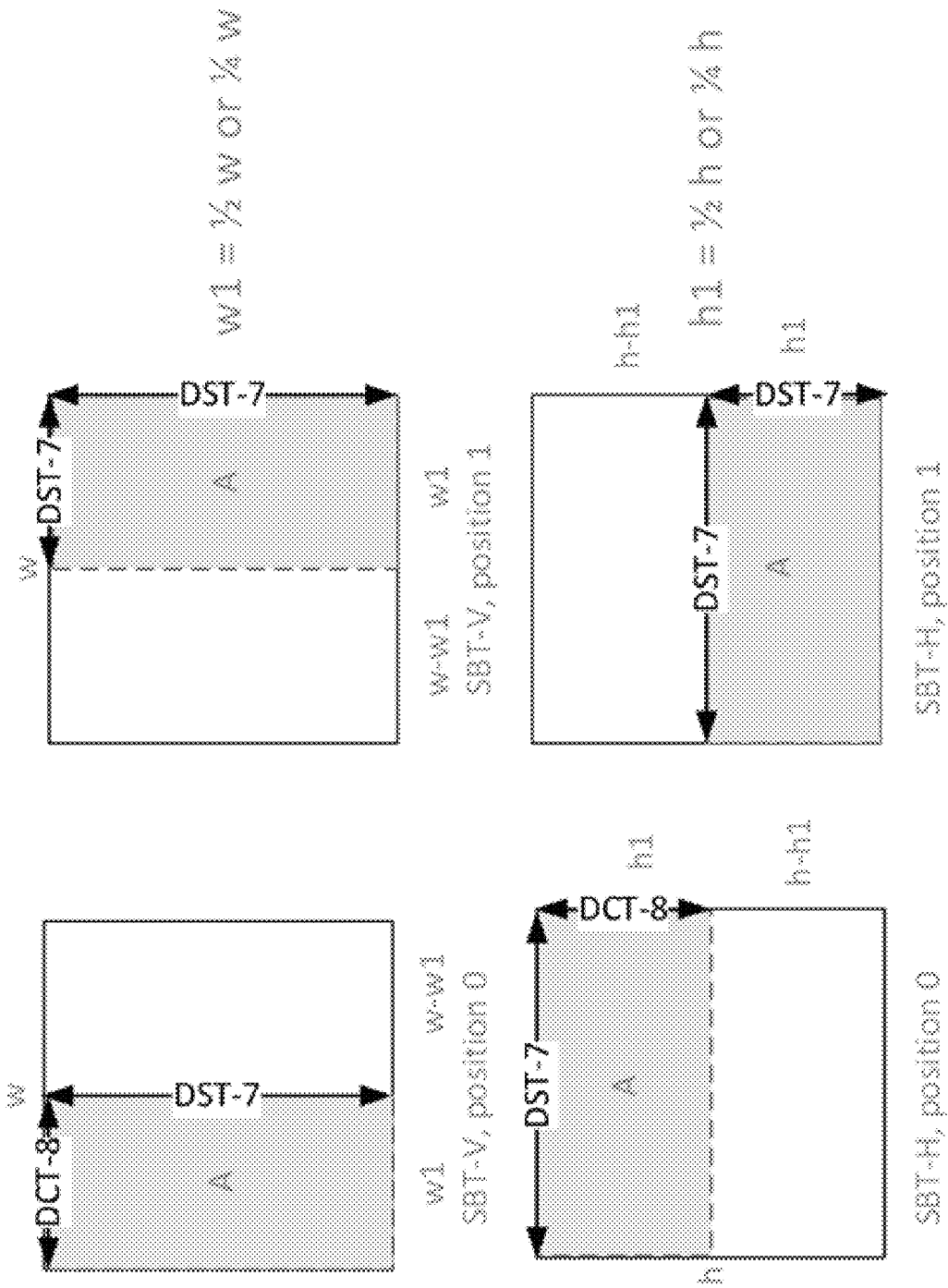
FIG. 15 shows an example of sub-block transform modes SBT-V and SBT-H.

8. In one example, the vertical transform and the horizontal transform must be the same in MTS.
   a. In one example, a block can only choose one of the two kinds of transforms as below:
      i. DCT-2 in horizontal transform and DCT-2 in vertical transform;
      ii. DST-7 in horizontal transform and DST-7 in vertical transform;
   b. In one example, the signaling for MTS may comprise at most one flag for a block.
      i. In one example, if the flag is equal to 0, DCT-2 in horizontal transform and DCT-2 in vertical transform; if the flag is equal to 1, DST-7 in horizontal transform and DST-7 in vertical transform.
      ii. In one example, if the flag is equal to 1, DCT-2 in horizontal transform and DCT-2 in vertical transform; if the flag is equal to 0, DST-7 in horizontal transform and DST-7 in vertical transform.
9. Suppose the block width and height are W and H, respectively. Bullet 7 may be applied only if
   a. W>=T1 and H>=T2, e.g. T1=T2=8;
   b. W<=T1 and H<=T2, e.g. T1=T2=16;
   c. Min(W, H)>=T1, e.g. T1=8;
   d. Max(W, H)<=T1, e.g. T1=32;
   e. W*H>=T1, e.g. T1=64;
   f. W*H<=T1, e.g. T1=256.
10. In one example, transforms excluding DST-8 can be applied in a block coded with SBT.
    a. In one example, only DCT-2 and DST-7 can be applied in a block coded with SBT.
    b. In one example, in the case of (SBT-V, position 0) for SBT as shown in FIG. 15, DCT-2 is applied horizontally and DST-7 is applied vertically.
    c. In one example, in the case of (SBT-H, position 0) for SBT as shown in FIG. 15, DST-7 is applied horizontally and DCT-2 is applied vertically.
11. Suppose the transform block width and height are W and H, respectively. In one example, the selection of transforms for a block coded with SBT may depend on transform block dimensions, wherein the transform block may be smaller than the coding block when SBT is applied.
    a. In one example, in the case of (SBT-V, position 0) for SBT as shown in FIG. 15, DCT-2 is applied horizontally and DST-7 is applied vertically if W>=T1; Otherwise, DCT-8 is applied horizontally and DST-7 is applied vertically. For example, T1=8.
    b. In one example, in the case of (SBT-H, position 0) for SBT as shown in FIG. 15, DST-7 is applied horizontally and DCT-2 is applied vertically if H>=T1; Otherwise, DST-7 is applied horizontally and DCT-8 is applied vertically. For example, T1=8.
12. Whether the transform coefficient zero-out is applied or not may be dependent on one or multiple messages signaled from the encoder to the decoder, such as in VPS/SPS/PPS/APS/DPS/slice header/picture header/sequence header/tile group header/tile/CTU row/CTU/CU/PU/TU, ect.
    a. In one example, the messages may comprise a flag to control the usage of MTS (e.g. sps_mts_enabled_flag in SPS).
    b. In one example, the messages may comprise a flag to control the usage of SBT (e.g. cu_sbt_flag in CU).
    c. In one example, whether the transform coefficient zero-out is applied or not may be dependent on a signaled message together with the transform block dimensions.
    d. In one example, once the MTS is not allowed in a bitstream (e.g., sps_mts_enabled_flag is equal to false), the transform coefficient zero-out may not be applied for a transform block with specified dimensions.
       i. For example, if sps_mts_enabled_flag is equal to false, for an transform block with dimensions M×32 (M<=32) or 32×N (N<=32), the transform coefficient zero-out may not be applied, thus the entire M×N (M<=32, N<=32) block is coded without zeroing out any transform coefficients.
    e. In one example, once the MTS is allowed in a bitstream (e.g., sps_mts_enabled_flag is equal to true), for a transform block with dimensions M×32 (M<=32) or 32×N (N<=32), the transform coefficient zero-out may be applied.
       i. In one example, for an M×N transform block, if sps_mts_enabled_flag is equal to true and cu_sbt_flag is equal to true, when M is equal to 32, only the left 16 columns of transform coefficients are kept. Similarly, when N is equal to 32, only the top 16 rows of transform coefficients are kept. All other coefficients are zeroed out.
13. Whether the transform coefficient zero-out is applied or not may be dependent on the transform type, and/or transform size.
    a. In one example, when the transform type is DCT-2, for an M×64 (M<=64) or 64×N (N<=64) transform block, the transform coefficient zero-out may be applied.
       i. In one example, for an M×N transform block coded with DCT-2, when M is equal to 64, only the left 32 columns of transform coefficients are kept. Similarly, when N is equal to 62, only the top 32 rows of transform coefficients are kept.
    b. In one example, when the transform type is DCT-8 or DST-7, for an M×32 (M<=32) or 32×N (N<=32) transform block, the transform coefficient zero-out may be applied.
       i. In one example, for an M×N transform block coded with DCT8 or DST7, when M is equal to 32, only the left 16 columns of transform coefficients are kept. Similarly, when N is equal to 32, only the top 16 rows of transform coefficients are kept.
    c. In one example, when transform skip mode is used for a block, the entire block is coded without zeroing out any transform coefficients.
14. Whether the transform coefficient zero-out is applied or not may be dependent on the implicit transform.
    a. In one example, for an M×32 (M<=32) or 32×N (N<=32) transform block coded with implicit transform, the transform coefficient zero-out may be applied.
       i. In one example, for an M×N transform block coded with implicit transform, when M is equal to 32, only the left 16 columns of transform coefficients are kept. Similarly, when N is equal to 32, only the top 16 rows of transform coefficients are kept.

Decision of Implicit MTS

15. Implicit MTS may be applied to certain modes no matter MTS is enabled or not at sequence/picture/sub-picture/slice/tile group/tile/brick/CTU row/CTU level (e.g., sps_mts_enabled_flag is equal to 1 or 0).
  a. In one example, implicit MTS may be applied to ISP mode when MTS is disabled at sequence/picture/sub-picture/slice/tile group/tile/brick/CTU row/CTU level (e.g. sps_mts_enabled_flag is equal to 0).
  b. In one example, implicit MTS may be applied to SBT mode when MTS is disabled at sequence/picture/sub-picture/slice/tile group/tile/brick/CTU row/CTU level (e.g. sps_mts_enabled_flag is equal to 0).
  c. In one example, implicit MTS may be applied to intra prediction modes when MW and/or LFNST and/or explicit MTS are not applied, and MTS is disabled at sequence/picture/sub-picture/slice/tile group/tile/brick/CTU row/CTU level (e.g. sps_mts_enabled_flag is equal to 0).
  d. Alternatively, implicit MTS may not be applied to a block with certain modes when MTS is disabled at sequence/picture/sub-picture/slice/tile group/tile/brick/CTU row/CTU level (e.g. sps_mts_enabled_flag is equal to 0).
    i. In one example, implicit MTS may not be applied to a block with intra prediction modes when MTS is disabled at sequence/picture/sub-picture/slice/tile group/tile/brick/CTU row/CTU level (e.g. sps_mts_enabled_flag is equal to 0).
    ii. In one example, implicit MTS may not be applied to a block with intra prediction modes excluding ISP mode when MTS is disabled at sequence/picture/sub-picture/slice/tile group/tile/brick/CTU row/CTU level (e.g. sps_mts_enabled_flag is equal to 0).
  e. In one example, for an ISP-coded block, the implicit MTS may be forced to be used.
    i. For example, the implicit transform may be forced to be used for an ISP-coded block (e.g., the variable implicitMtsEnabled may be inferred to be 1 for ISP-coded block).
    ii. For example, a bitstream constraint may be applied that implicit MTS must be used for ISP-coded block.
    iii. Alternatively, if SPS level MTS flag is equal to 0 (such as sps_mts_enabled_flag is equal to 0), DCT-2 transform may be used for ISP-coded block.
  f. In one example, for an SBT-coded block, the implicit MTS may be forced to be used.
    i. For example, when both the block width and block height of an SBT-coded block are less than or equal to 32, and the current coding block is in luma component, then the implicit MTS may be forced to be applied to such an SBT-coded block (e.g., the variable implicitMtsEnabled may be forced to be 1 for such an SBT-coded block).
      1) In another example, a bitstream constraint may be applied that implicit MTS must be used for such an ISP-coded block.
    ii. Alternatively, if SPS level MTS flag is equal to 0 (such as sps_mts_enabled_flag is equal to 0), DCT-2 transform may be used for an SBT-coded block.
  g. In one example, the dependence between the SPS level MTS flag and the implicit MTS may be used for INTRA-but-not-ISP-coded block only.
    i. For example, for an INTRA-coded but not ISP-coded block, whether the implicit MTS is used or not may be determined by the SPS level MTS controlling flag(s) (such as when sps_mts_enabled_flag is equal to 1 and sps_explicit_mts_intra_enabled_flag is equal to 0).
      1) Alternatively, whether the implicit MTS is used for an ISP/SBT-coded block is independent with the SPS level MTS flag.
16. Whether SBT/ISP is allowed or not for a sequence/video/picture/slice/tile group/tile/brick/sub-picture/CTU row/CTU/CU/block may be dependent on whether MTS is enabled or not (e.g., sps_mts_enabled_flag is equal to 1 or 0) for the sequence/video/picture/slice/tile group/tile/brick/sub-picture/CTU row/CTU/CU/block.
  a. In one example, SBT/ISP may be disallowed when MTS is disabled (e.g., sps_mts_enabled_flag is equal to 0).
  b. In one example, the explicit signaling of ISP flag and/or SBT flag may be under the condition that MTS is enabled (e.g., sps_mts_enabled_flag is equal to 1).
    i. For example, the ISP flag (e.g., intra_subpartitions_mode_flag, intra_subpartitions_split_flag) may be signaled once the sps_mts_enabled_flag is equal to 1.
    ii. For example, the SBT flag (e.g., cu_sbt_flag, cu_sbt_quad_flag, cu_sbt_horizontal_flag, cu_sbt_pos_flag) may be signaled once the sps_mts_enabled_flag is equal to 1.
  c. In one example, SBT/ISP may be disallowed when implicit MTS is disabled.
  d. In one example, the controlling information for SBT and/or ISP for a sequence/video/picture/slice/tile group/tile/brick/sub-picture/CTU row/CTU/CU/block (e.g. sps_isp_enabled_flag and/or sps_sbt_enabled_flag) must be 0 when MTS is disabled (e.g. sps_mts_enabled_flag is equal to 0) in a conformance bit-stream.
    i. Alternatively, the controlling information for SBT and/or ISP for a sequence/video/picture/slice/tile group/tile/brick/sub-picture/CTU row/CTU/CU/block (e.g. sps_isp_enabled_flag and/or sps_sbt_enabled_flag) is not signaled and inferred to be 0 when MTS is disabled (e.g. sps_mts_enabled_flag is equal to 0).
    ii. Alternatively, the controlling information for SBT and/or ISP for a sequence/video/picture/slice/tile group/tile/brick/sub-picture/CTU row/CTU/CU/block (e.g. sps_isp_enabled_flag and/or sps_sbt_enabled_flag) is signaled but omitted by the decoder. SBT and/or ISP is/are inferred to be disabled when MTS is disabled (e.g. sps_mts_enabled_flag is equal to 0).
17. Whether MTS is enabled or not (e.g., sps_mts_enabled_flag is equal to 1 or 0) for the sequence/video/picture/slice/tile group/tile/brick/sub-picture/CTU row/CTU/CU/block may be dependent on whether SBT/ISP is allowed or not for a sequence/video/picture/slice/tile group/tile/brick/sub-picture/CTU row/CTU/CU/block.
  a. In one example, MTS may be enabled (e.g., sps_mts_enabled_flag must be equal to 1) when SBT and/or ISP are/is enabled not for a sequence/video/picture/slice/tile group/tile/brick/sub-picture/CTU row/CTU/CU/block in a conformance bit-stream.
    i. Alternatively, sps_mts_enabled_flag is not signaled and inferred to be 1 when SBT and/or ISP is/are enabled not for a sequence/video/picture/ slice/tile group/tile/brick/sub-picture/CTU row/ CTU/CU/block.
  ii. Alternatively, sps_mts_enabled_flag is signaled but omitted by the decoder and MTS is inferred to be enabled when SBT and/or ISP is/are enabled not for a sequence/video/picture/slice/tile group/ tile/brick/sub-picture/CTU row/CTU/CU/block.
18. Implicit MTS and explicit MTS may be controlled with separated syntax elements. For example, sps_implict_mts_intra_enabled_flag and sps_explicit_mts_intra_enabled_flag controls whether to enable Implicit MTS and explicit MTS at sequence level, respectively.
  a. In one example, the syntax element controlling MTS (e.g. sps_mts_enabled_flag) in bullet 11-13 may be replaced by the syntax element controlling implicit MTS (e.g. sps_implict_mts_intra_enabled_flag).
  b. In one example, sps_implict_mts_intra_enabled_flag is signaled only when sps_mts_enabled_flag is equal to 1. If sps_implict_mts_intra_enabled_flag is not present, it may be inferred to be 0.
19. In one example, whether and/or how to apply implicit and/or explicit MTS may be controlled separately for different coding modes for a sequence/video/picture/ slice/tile group/tile/brick/sub-picture/CTU row/CTU/ CU/block.
  a. In one example, sps_mts_enabled_flag is 0 when implicit and/or explicit MTS are disabled for intra-coded CUs.
  b. In one example, sps_mts_enabled_flag does not control whether implicit and/or explicit MTS are enabled for inter-coded/non-intra-coded CUs.

General Claims

20. The decision of transform matrix may be done in CU/CB-level or TU-level.
  a. In one example, the decision is made in CU level wherein all TUs share the same transform matrix.
    i. Alternatively, furthermore, when one CU is split to multiple TUs, coefficients in one TU (e.g., the first or the last TU) or partial or all TUs may be utilized to determine the transform matrix.
  b. Whether to use the CU-level solution or TU-level solution may depend on the block size and/or VPDU size and/or maximum CTU size and/or coded information of one block.
    i. In one example, when the block size is larger than the VPDU size, CU-level determination method may be applied.
21. In the disclosed methods in the document, the coefficients or representative coefficients may be quantized or dequantized.
22. Transform skip may also be determined by the coefficients or representative coefficients implicitly with any disclosed method in the document.
23. In the disclosed methods in the document, the coefficients or representative coefficients may be modified before being used to derive the transforms.
  a. For example, a coefficient or representative coefficients may be clipped before being used to derive the transforms.
  b. For example, a coefficient or representative coefficients may be scaled before being used to derive the transforms.
  c. For example, a coefficient or representative coefficients may be added by an offset before being used to derive the transforms.
  d. For example, coefficients or representative coefficients may be filtered before being used to derive the transforms.
  e. For example, a coefficient or representative coefficients may be mapped to other values (e.g., via look up tables) before being used to derive the transforms.
24. The disclosed methods in the document may also be used to derive other coding modes/information by the coefficients or representative coefficients implicitly.
  a. In one example, the disclosed methods may be used to derive the secondary transforms which may be applied to sub-region of a block.
  b. Alternatively, furthermore, the representative coefficients are from those corresponding to the sub-region instead of the whole block.
25. In one example, whether to and/or how to apply the disclosed methods above may be signaled at sequence level/picture level/slice level/tile group level, such as in sequence header/picture header/SPS/VPS/DPS/PPS/ APS/slice header/tile group header.
26. In one example, whether to and/or how to apply the disclosed methods above may depend on coding information which may include:
  a. Block dimensions.
    i. In one example, for blocks with both width and height no greater than a threshold (e.g., 32), the above-mentioned implicit MTS method may be applied.
  b. QPs
  c. Picture or slice type (such as I-frame or PM-frame, I-slice or PM-slice)
    i. In one example, the proposed method may be enabled on I-frames but be disabled on PM frames.
  d. Structure partitioning method (single tree or dual tree)
    i. In one example, for single tree partitioning applied slices/pictures/bricks/tiles, the above-mentioned implicit MTS method may be applied.
  e. Coding mode (such as inter mode/intra mode/IBC mode etc.)
    i. In one example, for intra-coded blocks, the above-mentioned implicit MTS method may be applied.
  f. Coding methods (such as Intra Sub-block partition, Derived Tree (DT) method, etc.)
    i. In one example, for intra-coded blocks with DT applied, the above-mentioned implicit MTS method may be disabled.
    ii. In one example, for intra-coded blocks with ISP applied, the above-mentioned implicit MTS method may be disabled.
  g. Color components
    i. In one example, for luma blocks, the above-mentioned implicit MTS method may be applied while for chroma blocks, it is not applied.
  h. Intra-prediction mode (such as DC, vertical, horizontal, etc.)
  i. Motion information (such as MV and reference index).
  j. Standard Profiles/Levels/Tiers Coding Tools on Chroma Components 27. It is proposed that a coding tool X could be applied on one or multiple chroma components of a block depending on whether it is applied on one or multiple corresponding luma blocks. In the following discussion, "chroma components" may refer to "one or multiple chroma components".

a. In one example, the usage of the coding tool X for a chroma block is derived from the information of whether the coding tool is applied to the corresponding luma block. Therefore, no additional signaling of usage of coding tool X for chroma blocks are needed.
  i. In one example, a coding tool X may be applied on chroma components of a block if it is applied on the corresponding luma block; and it is not applied on chroma components of a block if it is not applied on the corresponding luma block.
  ii. In one example, coding tool X may be applied in the same manner on the luma component and the chroma components when it is applied on the corresponding luma block.
b. In one example, a message (such as a flag or an index) may be conditionally signaled to indicate whether coding tool X is applied on chroma components of a block. The condition may be defined as whether it is applied on the corresponding luma blocks. Alternatively, furthermore, it is not applied on chroma components of a block without signaling if it is not applied on the corresponding luma blocks.
  i. In one example, coding tool X may be applied in the same manner on the luma component and the chroma components when it is applied on the corresponding luma block and the message indicates that it is also applied on the chroma components.
  ii. In one example, coding tool X may be applied in a different manner on the luma component and the chroma components.
    1) It may be signaled how to apply coding tool X on the luma component and the chroma components separately.
c. In the above discussion, a "corresponding luma block" may refer to a luma block which covers at least one "corresponding sample" of the chroma block. The sample positions may be scaled according to the color format such as 4:4:4 or 4:2:0. Suppose the top-left position of the chroma block is (x0, y0), and the width and height of the chroma block are W and H, all of which are scaled to the luma sample unit.
  i. In one example, the corresponding sample may be at (x0, y0);
  ii. In one example, the corresponding sample may be at (x0+W−1, y0+H−1);
  iii. In one example, the corresponding sample may be at (x0+W/2−1, y0+H/2−1);
  iv. In one example, the corresponding sample may be at (x0+W/2, y0+H/2);
  v. In one example, the corresponding sample may be at (x0+W/2, y0+H/2−1);
  vi. In one example, the corresponding sample may be at (x0+W/2−1, y0+H/2);

28. It is proposed that a coding tool X could be applied on one chroma component of a block depending on whether it is applied on one or multiple corresponding blocks of the other chroma component.
  a. In one example, the usage of the coding tool X for a chroma block is derived from the information of whether the coding tool is applied to the corresponding blocks of the other chroma component. Therefore, no additional signaling of usage of coding tool X for chroma blocks are needed.
  b. In one example, a message (such as a flag) may be conditionally signaled to indicate whether coding tool X is applied on chroma components of a block. The condition may be defined as whether it is applied on the corresponding blocks of the other chroma component. Alternatively, furthermore, it is not applied on chroma components of a block without signaling if it is not applied on the corresponding blocks of the other chroma component.

29. It is proposed that a coding tool X could be applied on luma component of a block depending on whether it is applied on one or multiple corresponding blocks of the chroma components.
  a. In one example, the usage of the coding tool X for a luma block is derived from the information of whether the coding tool is applied to the corresponding blocks of the chroma components. Therefore, no additional signaling of usage of coding tool X for luma blocks are needed.
  b. In one example, a message (such as a flag) may be conditionally signaled to indicate whether coding tool X is applied on luma components of a block. The condition may be defined as whether it is applied on the corresponding blocks of the chroma components. Alternatively, furthermore, it is not applied on luma components of a block without signaling if it is not applied on the corresponding blocks of the chroma components.

30. The coding tool X mentioned above may be defined as follows.
  a. In one example, coding tool X may be MTS.
  b. In one example, coding tool X may be transform skip.
  c. In one example, coding tool X may be RST.
  d. In one example, coding tool X may be RBDPCM.
  e. In one example, coding tool X may be BDPCM.

Signaling of MTS Indices and Transform Skip Flag

31. It is proposed that the MTS indices and/or transform skip flag may be conditionally signaled, depending on the usage of BDPCM or QR-BDPCM or any variance of BDPCM.
  a. In one example, the MTS indices and/or transform skip flag may not be signaled for a block in the bitstream when the BDPCM or QR-BDPCM or any variance of BDPCM is enabled for the block (such as intra_bdpcm_flag equal to true).
    i. Alternatively, furthermore, the transform skip flag for a block may be inferred to be true when BDPCM or QR-BDPCM or any variance of BDPCM is enabled in the block.
  b. In one example, the MTS index may be inferred to be 0 for a block when the BDPCM or QR-BDPCM or any variance of BDPCM is enabled in the block.

32. Fixed-length coding may be applied to code different MTS types (such as DST7-DST7, DCT8-DST7, DST7-DCT8, DCT8-DCT8 in VVC spec) excluding TS and DCT-2.
  a. In one example, fixed-length with 2 bins may be applied.
  b. In one example, each bin may be context coded.
  c. In one example, the first or the last bin may be context coded, and the remaining bins are bypass coded.
  d. In one example, all bins are bypass coded.

33. The context modeling for transform matrix index (e.g., TS, DCT-2, other transform matrices) may depend on coded mode, transform block size and/or QT depth and/or MTT depth and/or BT depth and/or TT depth.

a. In one example, the context modeling for transform matrix index may depend on the coding mode of the block, such as whether the block is coded with intra/inter/IBC mode.
b. In one example, the context modeling for transform matrix index may depend on a function of multiple partition depths which may include QT depth, MTT depth, BT depth, TT depth.
c. In one example, the context modeling for transform matrix index may depend on the transform depth of a TU/TB relative to the CU/PU.
d. In one example, the context index increasement may be set to a function of TU/TB dimension.
  i. In one example, the context index increasement may be set to ((Log 2(TbW)+log 2(TbH))>>1)−X, wherein TbW and TbH indicates the width and height of the transform block, X is an integer (such as X=2).
  ii. In one example, the context index increasement may be set to Log 2(max(TbW, TbH))−X, wherein TbW and TbH indicates the width and height of the transform block, X is an integer (such as X=2), max(a, b) returns the larger value.
  iii. In one example, the context index increasement may be set to Log 2(min(TbW, TbH))−X, wherein TbW and TbH indicates the width and height of the transform block, X is an integer (such as X=2), min(a, b) returns the smaller value.
  iv. The context index increasement mentioned above may be further clipped to a range, such as [k0, k1], wherein k0 and k1 are integers.
e. In one example, the context index increasement may be set to a function of TU/TB width or height.
f. In one example, the context index increasement may be set to a function of MTT depth.
g. In one example, the context index increasement may be set to min(K, quad tree depth), wherein the function min(a, b) returns the smaller value between a and b, K is an integer such as 4 or 5.
h. In one example, the above methods may be applied to code specific bins used in the matrix index coding.
  i. In one example, the bin which is used to indicate whether it is DCT2 or not is context coded and context modeling is based on above methods, such as the first bin of tu_mts_idx.
34. It is proposed that context modeling for coding the indication of whether it is TS or DCT2 may be shared.
a. In one example, context modeling (i.e., how to select a context index) for coding transform_skip_flag and first bin of tu_mts_idx may be the same.
b. Alternatively, furthermore, the contexts used for coding these two bins may be different or partially shared.
  i. In one example, a first set of contexts may be used for coding transform_skip_flag and a second set of contexts may be used for coding the first bin of tu_mts_idx. And these two sets are not shared.
c. Alternatively, furthermore, the contexts used for coding these two bins may be fully shared.
35. It is proposed that a single context may be used for partial of or all the context coded bins of the syntax element tu_mts_idx.
a. For example, a single context may be used for the first bin of tu_mts_idx.
b. For example, a single context may be used for all bins except the first bin of tu_mts_idx.
  i. Alternatively, furthermore, the first bin of tu_mts_idx may be context coded using the context modeling method mentioned in bullet 24.
    1. In one example, the first bin may be context coded with N contexts depend on transform size (such as the context index increasement may be set to ((Log 2(TbW)+log 2(TbH))>>1)−2 so that N=4), and all the remaining bins may be context coded with a single context.
c. Alternatively, furthermore, the first and the second bins of tu_mts_idx may be context coded, and all the remaining bins may be bypass coded.
d. In one example, the first bin may be context coded with N contexts depend on transform size (such as N=4), while the second bin may be context coded with a single context and the remaining bins may be bypass coded. For example, all bins of tu_mts_idx may be bypass coded.
36. The binarization of transform matrices may be defined in the following ways:
a. In one example, the table below shows the mapped bins and corresponding matrix.

| Transform matrix | Bin string |
|---|---|
| TS | 0 |
| DCT2-DCT2 | 1 0 |
| DST7-DST7 | 1 1 0 |
| DCT8-DST7 | 1 1 1 0 |
| DST7-DCT8 | 1 1 1 1 0 |
| DCT8-DCT8 | 1 1 1 1 1 | b. In one example, the table below shows the mapped bins and corresponding matrix.

| Transform matrix | Bin string |
|---|---|
| TS | 0 |
| DCT2-DCT2 | 1 0 |
| DST7-DST7 | 1 1 0 0 |
| DCT8-DST7 | 1 1 0 1 |
| DST7-DCT8 | 1 1 1 0 |
| DCT8-DCT8 | 1 1 1 1 | c. In one example, the table below shows the mapped bins and corresponding matrix.

| Transform matrix | Bin string |
|---|---|
| TS | 1 |
| DCT2-DCT2 | 0 1 |
| DST7-DST7 | 0 0 0 0 |
| DCT8-DST7 | 0 0 0 1 |
| DST7-DCT8 | 0 0 1 0 |
| DCT8-DCT8 | 0 0 1 1 | d. In one example, the table below shows the mapped bins and corresponding matrix.

| Transform matrix | Bin string |
|---|---|
| TS | 0 |
| DCT2-DCT2 | 10 |
| DST7-DST7 | 11 | e. In one example, the table below shows the mapped bins and corresponding matrix.

| Transform matrix | Bin string |
|---|---|
| TS | 0 |
| DCT2-DCT2 | 11 |
| DST7-DST7 | 10 | f. In one example, the table below shows the mapped bins and corresponding matrix.

| Transform matrix | Bin string |
|---|---|
| TS | 1 |
| DCT2-DCT2 | 00 |
| DST7-DST7 | 01 | g. In one example, the table below shows the mapped bins and corresponding matrix.

| Transform matrix | Bin string |
|---|---|
| TS | 1 |
| DCT2-DCT2 | 01 |
| DST7-DST7 | 00 |

37. It is proposed that MTS have only two candidate combination of transforms: DCT2-DCT2 and DST7-DST7.

The examples described above may be incorporated in the context of the methods described below, e.g., methods 1705, 1710, 1715, 1720, 1725, 1730, 1735 and 1740, which may be implemented at a video encoder and/or decoder.

Figure 17A:
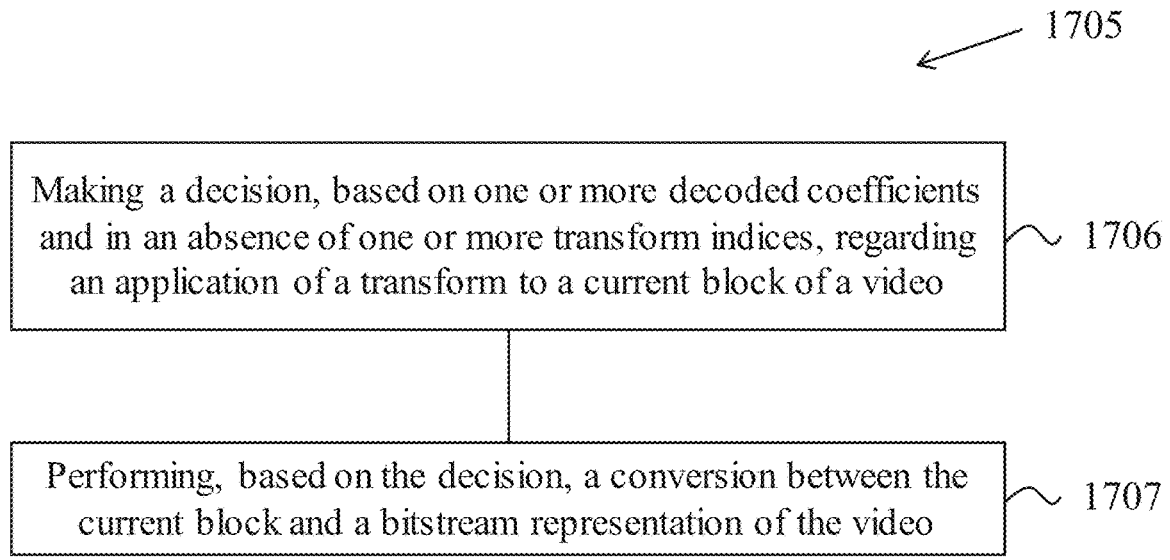

FIG. 17A shows a flowchart of an exemplary method for video processing. The method 1705 includes, at step 1706, making a decision, based on one or more decoded coefficients and in an absence of one or more transform indices, regarding an application of a transform to a current block of a video.

The method 1705 includes, at step 1707, performing, based on the decision, a conversion between the current block and a bitstream representation of the video.

Figure 17B:
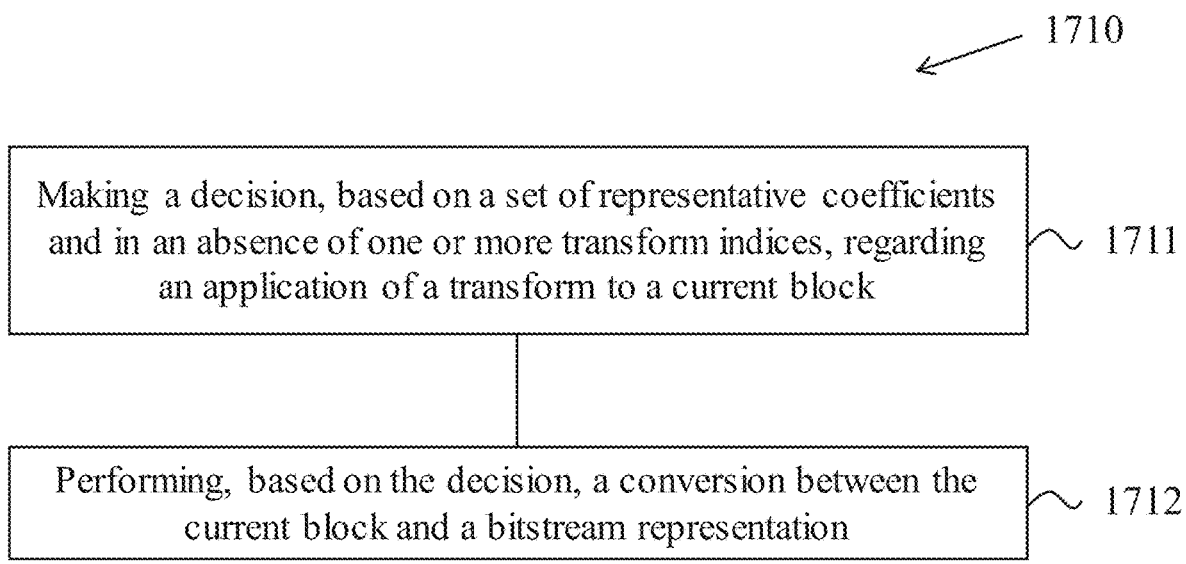

FIG. 17B shows a flowchart of an exemplary method for video processing. The method 1710 includes, at step 1711, making a decision, based on a set of representative coefficients and in an absence of one or more transform indices, regarding an application of a transform to a current block.

The method 1710 includes, at step 1712, performing, based on the decision, a conversion between the current block and a bitstream representation. In some embodiments, the set of representative coefficients is included in a set of significant coefficients, and each of the set of significant coefficients is non-zero.

Figure 17C:
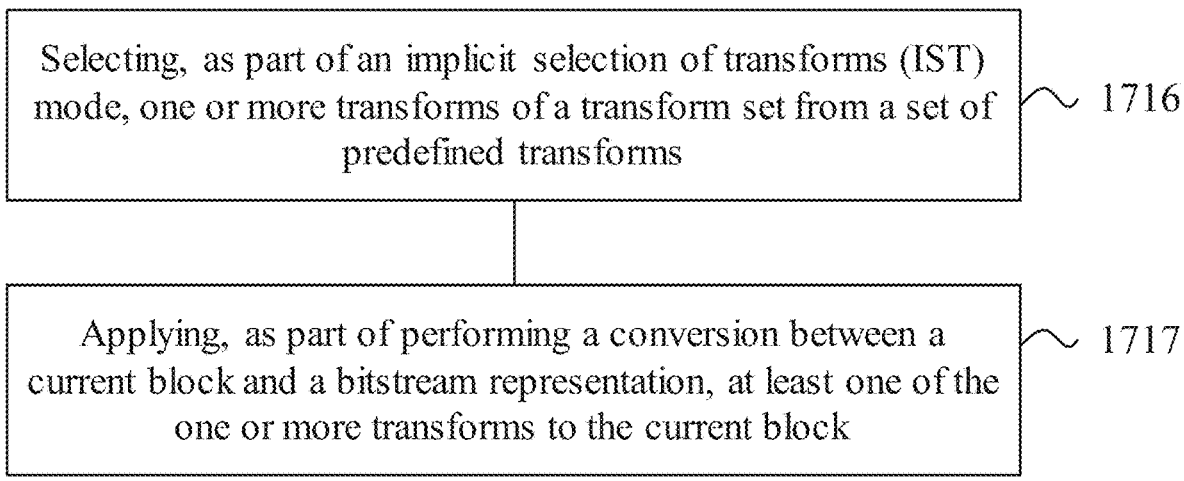

FIG. 17C shows a flowchart of an exemplary method for video processing. The method 1715 includes, at step 1716, selecting, as part of an implicit selection of transforms (IST) mode, one or more transforms of a transform set from a set of predefined transforms.

The method 1715 includes, at step 1717, applying, as part of performing a conversion between a current block and a bitstream representation, at least one of the one or more transforms to the current block.

Figure 17D:
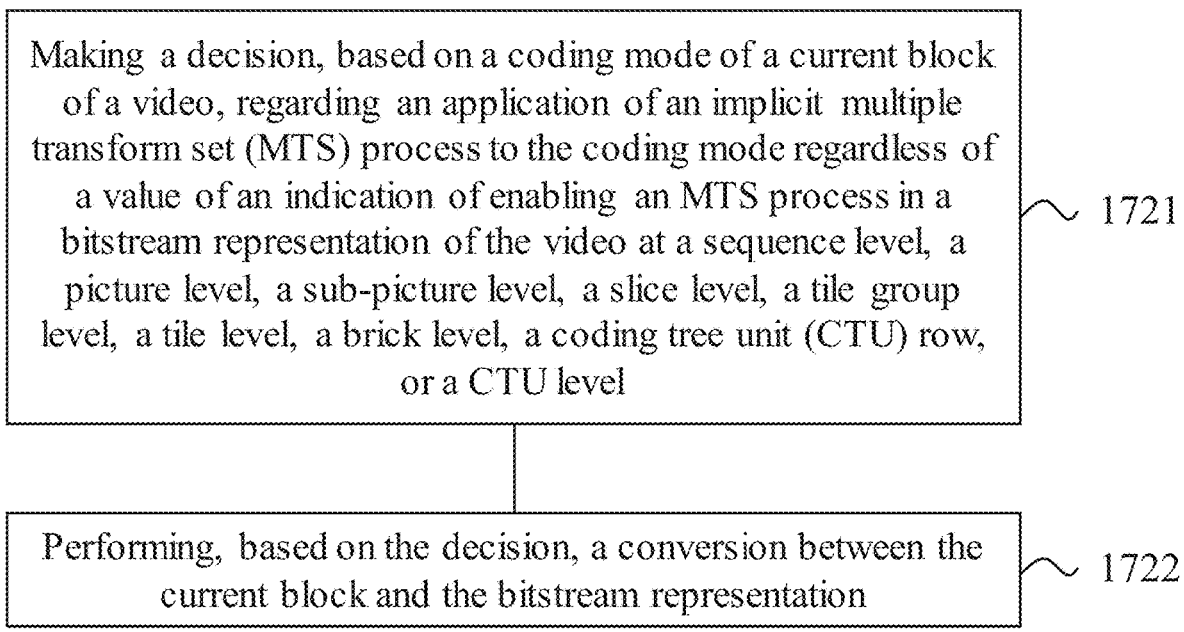

FIG. 17D shows a flowchart of an exemplary method for video processing. The method 1720 includes, at step 1721, making a decision, based on a coding mode of a current block of a video, regarding an application of an implicit multiple transform set (MTS) process to the coding mode regardless of a value of an indication of enabling an MTS process in a bitstream representation of the video at a sequence level, a picture level, a sub-picture level, a slice level, a tile group level, a tile level, a brick level, a coding tree unit (CTU) row, or a CTU level.

The method 1720 includes, at step 1722, performing, based on the decision, a conversion between the current block and the bitstream representation. In some embodiments, the implicit MTS process includes using a characteristic of the current block to determine a transform used during the conversion.

Figures 17E, 17F:
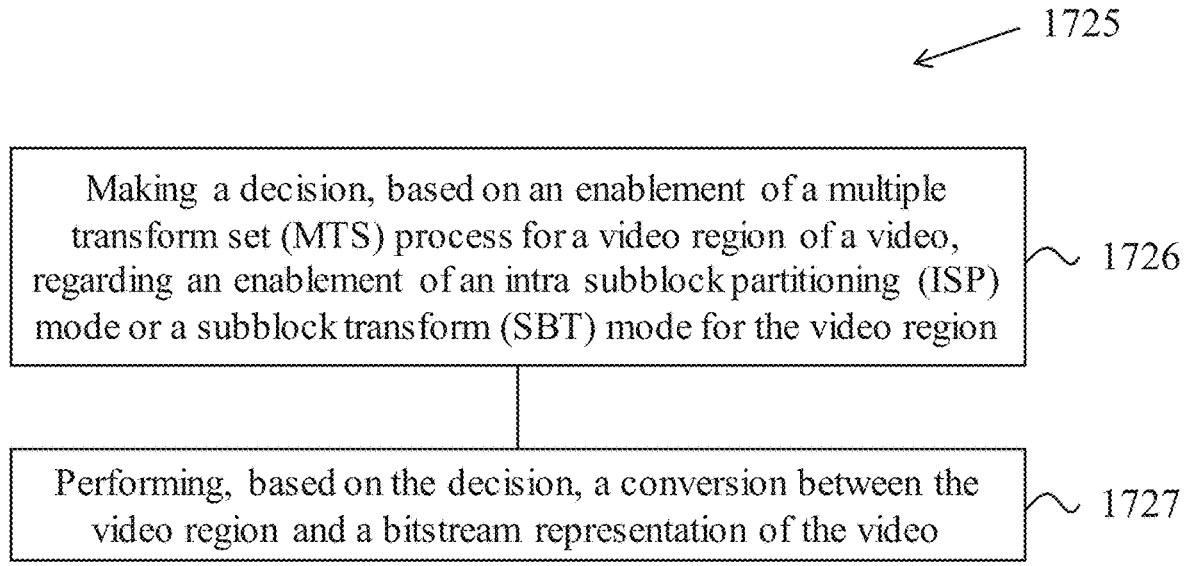

FIG. 17E shows a flowchart of an exemplary method for video processing. The method 1725 includes, at step 1726, making a decision, based on an enablement of a multiple transform set (MTS) process for a video region of a video, regarding an enablement of an intra subblock partitioning (ISP) mode or a subblock transform (SBT) mode for the video region.

The method 1725 includes, at step 1727, performing, based on the decision, a conversion between the video region and a bitstream representation of the video.

FIG. 17F shows a flowchart of an exemplary method for video processing. The method 1730 includes, at step 1731, making a decision, based on an enablement of an intra subblock partitioning (ISP) mode or a subblock transform (SBT) mode for a video region of a video, regarding an enablement of a multiple transform set (MTS) process for the video region.

The method 1730 includes, at step 1732, performing, based on the decision, a conversion between the video region and a bitstream representation of the video.

FIG. 17G shows a flowchart of an exemplary method for video processing. The method 1735 includes, at step 1736, performing a conversion between a current block of a video and a bitstream representation of the video. In some embodiments, the bitstream representation comprises a first syntax element that controls a usage of an implicit multiple transform set (MTS) process on the current block and a second syntax element that controls a usage of an explicit MTS process on the current block, the first syntax element is different from the second syntax element, and the implicit MTS process includes using a characteristic of the current block to determine a transform used during the conversion.

FIG. 17H shows a flowchart of an exemplary method for video processing. The method 1740 includes, at step 1741, making a decision, for a video region of a video, regarding an application of an implicit multiple transform set (MTS) process and/or an explicit MTS process to the video region using one or more control parameters that are based on a coding mode of the video region.

The method 1740 includes, at step 1742, performing, based on the decision, a conversion between the video region and a bitstream representation of the video. In some embodiments, the implicit MTS process includes using a characteristic of the current block to determine a transform used during the conversion.

5 Example Implementations of the Disclosed Technology

In the following embodiments, additions are indicated using bolded double braces, e.g., {{a}} indicates that "a" has been added, whereas deletions are indicated using bolded double brackets, e.g., [[a]] indicates that "a" has been deleted.

5.1 Embodiment #1

The working draft specified in JVET-N1001-v7 may be changed as below.

8.7.4 Transformation Process for Scaled Transform Coefficients 8.7.4.1 General

TABLE 8-17

Specification of trTypeHor and trTypeVer depending on cu_sbt_horizontal_flag and cu_sbt_pos_flag

| cu_sbt_horizontal_flag | cu_sbt_pos_flag | trTypeHor | trTypeVer |
|---|---|---|---|
| 0 | 0 | {{nTbW >= 8? 0:}} 2 | 1 |
| 0 | 1 | 1 | 1 |
| 1 | 0 | 1 | {{nTbH >= 8? 0:}} 2 |
| 1 | 1 | 1 | 1 |

5.2 Embodiment 2

The working draft specified in JVET-N1001-v8 may be changed as below.

7.3.7.10 Transform Unit Syntax

```
if( tu_cbf_luma[ x0 ][ y0 ] && treeType != DUAL_TREE_CHROMA
        && ( tbWidth <= 32 ) && ( tbHeight <= 32 )
        && ( IntraSubPartitionsSplit[ x0 ][ y0 ] = = ISP_NO_SPLIT )
        && ( !cu_sbt_flag ) {{&& (!intra_bdpcm_flag[ x0 ][ y0 ])}}) {
    if( transform_skip_enabled_flag && tbWidth <= MaxTsSize && tbHeight
<= MaxTsSize )
        transform_skip_flag[ x0 ][ y0 ]                                    ae(v)
    if( (( CuPredMode[ x0 ][ y0 ] != MODE_INTRA &&
sps_explicit_mts_inter_enabled_flag )
        | | ( CuPredMode[ x0 ][ y0 ] = = MODE_INTRA &&
sps_explicit_mts_intra_enabled_flag ))
        && ( !transform_skip_flag[ x0 ][ y0 ] ) )
        tu_mts_idx[ x0 ][ y0 ]                                             ae(v)
}
```

Alternatively, the following may apply:

```
if( tu_cbf_luma[ x0 ][ y0 ] && treeType != DUAL_TREE_CHROMA
        && ( tbWidth <= 32 ) && ( tbHeight <= 32 )
        && ( IntraSubPartitionsSplit[ x0 ][ y0 ] = = ISP_NO_SPLIT )
    && ( !cu_sbt_flag ) ) {
    if({{ !intra_bdpcm_flag[ x0 ][ y0 ] && }} transform_skip_enabled_flag &&
tbWidth <= MaxTsSize && tbHeight <= MaxTsSize )
        transform_skip_flag[ x0 ][ y0 ]                                    ae(v)
    if( (( CuPredMode[ x0 ][ y0 ] != MODE_INTRA &&
sps_explicit_mts_inter_enabled_flag )
        | | ( CuPredMode[ x0 ][ y0 ] = = MODE_INTRA &&
sps_explicit_mts_intra_enabled_flag ))
        && ( !transform_skip_flag[ x0 ][ y0 ] ) )
        tu_mts_idx[ x0 ][ y0 ]                                             ae(v)
}
```

5.3 Embodiment 3

The working draft specified in JVET-N1001-v8 may be changed as below.

9.5.3.7 Fixed-Length Binarization Process

{{

9.5.3.8 Binarization Process for tu_mts_idx

Input to this process is a request for a binarization for the syntax element tu_mts_idx.

Output of this process is the binarization of the syntax element.

The binarization for the syntax element tu_mts_idx is specified in Table 9-14.

TABLE 9-14

Binarization for tu_mts_idx

| Value of tu_mts_idx | Bin string |
|---|---|
| 1 | 0 |
| 2 | 100 |
| 3 | 101 |
| 4 | 110 |
| 5 | 111 |

5.4 Embodiment 4
The working draft specified in JVET-N1001-v8 may be changed as below.
9.5.4.2 Derivation Process for ctxTable, ctxIdx and bypass-Flag
9.5.4.2.1 General

TABLE 9-17

Assignment of ctxInc to syntax elements with context coded bins

| Syntax element | binIdx | | | | | |
|---|---|---|---|---|---|---|
| | 0 | 1 | 2 | 3 | 4 | >=5 |
| transform_skip_flag[ ][ ] | 0 | na | na | na | na | na |
| tu_mts_idx[ ][ ] | [[cqtDepth]] {{((Log2(TbW) + log2(TbH)) >> 1) − 2}} | [[6]] {{4}} | [[7]] {{5}} | [[8]] {{6}} | na | na |

5.5 Embodiment 5
The working draft specified in JVET-N1001-v8 may be changed as below.
9.5.4.3 Derivation Process for ctxTable, ctxIdx and bypass-Flag
9.5.4.3.1 General

TABLE 9-17

Assignment of ctxInc to syntax elements with context coded bins

| Syntax element | binIdx | | | | | |
|---|---|---|---|---|---|---|
| | 0 | 1 | 2 | 3 | 4 | >=5 |
| transform_skip_flag[ ][ ] | 0 | na | na | na | na | na |
| tu_mts_idx[ ][ ] | [[cqtDepth]] {{0}} | [[6]] {{1}} | [[7]] {{2}} | [[8]] {{3}} | na | na |

5.6 Embodiment 6
The working draft specified in JVET-N1001-v8 may be changed as below.
9.5.4.4 Derivation Process for ctxTable, ctxIdx and bypass-Flag
9.5.4.4.1 General

TABLE 9-17

Assignment of ctxInc to syntax elements with context coded bins

| Syntax element | binIdx | | | | | |
|---|---|---|---|---|---|---|
| | 0 | 1 | 2 | 3 | 4 | >=5 |
| transform_skip_flag[ ][ ] | 0 | na | na | na | na | na |
| tu_mts_idx[ ][ ] | [[cqtDepth]] {{0}} | [[6]] {{1}} | [[7]] {{1}} | [[8]] {{1}} | na | na |

5.7 Embodiment 7

The working draft specified in JVET-N1001-v8 may be changed as below.

9.5.4.5 Derivation Process for ctxTable, ctxIdx and bypass-Flag 9.5.4.5.1 General

TABLE 9-17

Assignment of ctxInc to syntax elements with context coded bins

| Syntax element | binIdx | | | | | |
|---|---|---|---|---|---|---|
| | 0 | 1 | 2 | 3 | 4 | >=5 |
| transform_skip_flag[ ][ ] | 0 | na | na | na | na | na |
| tu_mts_idx[ ][ ] | [[cqtDepth]] {{((Log2(TbW) + log2(TbH)) >> 1) − 2}} | [[6]] {{4}} | [[7]] {{4}} | [[8]] {{4}} | na | na |

5.8 Embodiment 8

The working draft specified in JVET-N1001-v8 may be changed as below.

9.5.4.6 Derivation Process for ctxTable, ctxIdx and bypass-Flag 9.5.4.6.1 General

TABLE 9-17

Assignment of ctxInc to syntax elements with context coded bins

| Syntax element | binIdx | | | | | |
|---|---|---|---|---|---|---|
| | 0 | 1 | 2 | 3 | 4 | >=5 |
| transform_skip_flag[ ][ ] | 0 | na | na | na | na | na |
| tu_mts_idx[ ][ ] | [[cqtDepth]] {{((Log2(TbW) + log2(TbH)) >> 1) − 2}} | [[6]] {{4}} | [[7]] {{bypass}} | [[8]] {{bypass}} | na | na |

Alternatively, the following may apply:

| Syntax element | binIdx | | | | | |
|---|---|---|---|---|---|---|
| | 0 | 1 | 2 | 3 | 4 | >=5 |
| transform_skip_flag[ ][ ] | 0 | na | na | na | na | na |
| tu_mts_idx[ ][ ] | [[cqtDepth]] {{((Log2(TbW) + log2(TbH)) >> 1) − 2}} | [[6]] {{4}} | [[7]] {{4}} | [[8]] {{4}} | na | na |

5.9 Embodiment 9

The working draft specified in JVET-O2001-vC may be changed as below.

8.7.4 Transformation Process for Scaled Transform Coefficients 8.7.4.1 General

The variable implicitMtsEnabled is derived as follows:

If [[sps_mts_enabled_flag is equal to 1 and]] one of the following conditions is true, implicitMtsEnabled is set equal to 1:

IntraSubPartitionsSplitType is not equal to ISP_NO_SPLIT cu_sbt_flag is equal to 1 and Max(nTbW, nTbH) is less than or equal to 32 sps_explicit_mts_intra_enabled_flag is equal to 0 and CuPredMode[0][xTbY][yTbY] is equal to MODE_INTRA and lfnst_idx[x0][y0] is equal to 0 and intra_mip_flag[x0][y0] is equal to 0

Otherwise, implicitMtsEnabled is set equal to 0.

5.10 Embodiment 10

The working draft specified in JVET-O2001-vC may be changed as below.

8.7.4 Transformation Process for Scaled Transform Coefficients 8.7.4.1 General

The variable implicitMtsEnabled is derived as follows:

If [[sps_mts_enabled_flag is equal to 1 and]] one of the following conditions is true, implicitMtsEnabled is set equal to 1:

IntraSubPartitionsSplitType is not equal to ISP_NO_SPLIT cu_sbt_flag is equal to 1 and Max(nTbW, nTbH) is less than or equal to 32

{{sps_mts_enabled_flag is equal to 1 and}} sps_explicit_mts_intra_enabled_flag is equal to 0 and CuPredMode[0][xTbY][yTbY] is equal to MODE_INTRA and lfnst_idx[x0][y0] is equal to 0 and intra_mip_flag[x0][y0] is equal to 0

Otherwise, implicitMtsEnabled is set equal to 0.

5.11 Embodiment 11

The working draft specified in JVET-O2001-vC may be changed as below.

7.3.2.3 Sequence parameter set RBSP syntax

| | |
|---|---|
| sps_mts_enabled_flag | u(1) |
| if( sps_mts_enabled_flag ) { | |
|     sps_explicit_mts_intra_enabled_flag | u(1) |
|     sps_explicit_mts_inter_enabled_flag | u(1) |
| {{    sps_sbt_enabled_flag | u(1) |
|     if( sps_sbt_enabled_flag ) | |
|         sps_sbt_max_size_64_flag | u(1) }} |
| } | |
| [[ sps_sbt_enabled_flag | u(1) |
|     if( sps_sbt_enabled_flag ) | |
|         sps_sbt_max_size_64_flag | u(1) ]] |

5.12 Embodiment 12

The working draft specified in JVET-O2001-vC may be changed as below.

7.3.2.3 Sequence Parameter Set RBSP Syntax

| | |
|---|---|
| sps_isp_enabled_flag | u(1) |
| ... | |
| [[ sps_mts_enabled_flag | u(1) |
| if( sps_mts_enabled_flag ) { ]] | |
|     sps_explicit_mts_intra_enabled_flag | u(1) |
|     sps_explicit_mts_inter_enabled_flag | u(1) |
| [[ } ]] | |

| | |
|---|---|
| sps_sbt_enabled_flag | u(1) |
| if( sps_sbt_enabled_flag ) | |
|     sps_sbt_max_size_64_flag | u(1) |

1.4.3.3 Sequence Parameter Set RBSP Semantics

[[sps_mts_enabled_flag equal to 1 specifies that sps_explicit_mts_intra_enabled_flag is present in the sequence parameter set RBSP syntax and that sps_explicit_mts_inter_enabled_flag is present in the sequence parameter set RBSP syntax. sps_mts_enabled_flag equal to 0 specifies that sps_explicit_mts_intra_enabled_flag is not present in the sequence parameter set RBSP syntax and that sps_explicit_mts_inter_enabled_flag is not present in the sequence parameter set RBSP syntax.]]

8.7.4 Transformation Process for Scaled Transform Coefficients 8.7.4.1 General

The variable implicitMtsEnabled is derived as follows:

If [[sps_mts_enabled_flag is equal to 1 and]] one of the following conditions is true, implicitMtsEnabled is set equal to 1:

IntraSubPartitionsSplitType is not equal to ISP_NO_SPLIT cu_sbt_flag is equal to 1 and Max(nTbW, nTbH) is less than or equal to 32 sps_explicit_mts_intra_enabled_flag is equal to 0 and CuPredMode[0][xTbY][yTbY] is equal to MODE_INTRA and lfnst_idx[ x0][y0] is equal to 0 and intra_mip_flag[x0][y0] is equal to 0

Otherwise, implicitMtsEnabled is set equal to 0.

5.13 Embodiment 13

The working draft specified in JVET-O2001-vC may be changed as below.

8.7.4 Transformation Process for Scaled Transform Coefficients 8.7.4.1 General

The variable implicitMtsEnabled is derived as follows:

If [[sps_mts_enabled_flag is equal to 1 and]] one of the following conditions is true, implicitMtsEnabled is set equal to 1:

IntraSubPartitionsSplitType is not equal to ISP_NO_SPLIT cu_sbt_flag is equal to 1 and Max(nTbW, nTbH) is less than or equal to 32

{{sps_mts_enabled_flag is equal to 1 and}} sps_explicit_mts_intra_enabled_flag is equal to 0 and CuPredMode[0][xTbY][yTbY] is equal to MODE_INTRA and lfnst_idx[x0][y0] is equal to 0 and intra_mip_flag[x0][y0] is equal to 0

Otherwise, implicitMtsEnabled is set equal to 0.

5.14 Embodiment 14

The working draft specified in JVET-O2001-vC may be changed as below.

7.3.8.5 Coding Unit Syntax

```
if ( sps_isp_enabled_flag {{&& sps_mts_enabled_flag}} &&
  intra_luma_ref_idx[ x0 ][ y0 ] = = 0 &&
    ( cbWidth <= MaxTbSizeY && cbHeight <= MaxTbSizeY ) &&
    ( cbWidth * cbHeight > MinTbSizeY * MinTbSizeY ) )
    intra_subpartitions_mode_flag[ x0 ][ y0 ]                    ae(v)
  if( intra_subpartitions_mode_flag[ x0 ][ y0 ] = = 1 )
    intra_subpartitions_split_flag[ x0 ][ y0 ]                   ae(v)
...
  if( cu_cbf ) {
    if( CuPredMode[ chType ][ x0 ][ y0 ] = = MODE_INTER && sps_sbt_enabled_flag {{&&
sps_mts_enabled_flag}} && !ciip_flag[ x0 ][ y0 ] && !MergeTriangleFlag[ x0 ][ y0 ] ) {
      if( cbWidth <= MaxSbtSize && cbHeight <= MaxSbtSize ) {
        allowSbtVerH = cbWidth >= 8
```

```
            allowSbtVerQ = cbWidth >= 16
            allowSbtHorH = cbHeight >= 8
            allowSbtHorQ = cbHeight >= 16
            if( allowSbtVerH || allowSbtHorH || allowSbtVerQ || allowSbtHorQ )
                cu_sbt_flag                                                          ae(v)
        }
        if( cu_sbt_flag ) {
            if( ( allowSbtVerH || allowSbtHorH ) && ( allowSbtVerQ || allowSbtHorQ) )
                cu_sbt_quad_flag                                                     ae(v)
            if( ( cu_sbt_quad_flag && allowSbtVerQ && allowSbtHorQ ) ||
                  ( !cu_sbt_quad_flag && allowSbtVerH && allowSbtHorH ) )
                cu_sbt_horizontal_flag                                               ae(v)
            cu_sbt_pos_flag                                                          ae(v)
        }
    }
```

5.15 Embodiment 15

This embodiment is to apply transform coefficient zero-out according to the SPS flag sps_mts_enabled_flag.

The working draft specified in JVET-O2001-v14 may be changed as below.

7.3.8.11 Residual Coding Syntax

|  | Descriptor |
|---|---|
| residual_coding( x0, y0, log2TbWidth, log2TbHeight, cIdx ) { | |
|   if( ( tu_mts_idx[ x0 ][ y0 ] > 0 \|\| | |
|       ({{sps_mts_enabled_flag &&}} | |
| cu_sbt_flag && log2TbWidth < 6 && log2TbHeight < 6 ) ) | |
|     && cIdx = = 0 && log2TbWidth > 4 ) | |
|     log2ZoTbWidth = 4 | |
|   else | |
|     log2ZoTbWidth = Min( log2TbWidth, 5 ) | |
|   MaxCcbs = 2 * ( 1 << log2TbWidth ) * ( 1 << log2TbHeight ) | |
|   if( tu_mts_idx[ x0 ][ y0 ] > 0 \|\| | |
|       ({{sps_mts_enabled_flag &&}} | |
| cu_sbt_flag && log2TbWidth < 6 && log2TbHeight < 6 ) ) | |
|     && cIdx = = 0 && log2TbHeight > 4 ) | |
|     log2ZoTbHeight = 4 | |
|   else | |
|     log2ZoTbHeight = Min( log2TbHeight, 5 ) | |
|   if( log2TbWidth > 0 ) | |
|     last_sig_coeff_x_prefix | ae(v) |

In some embodiments, the following technical solutions can be implemented:

A1. A method for video processing, comprising making a decision, based on one or more decoded coefficients and in an absence of one or more transform indices, regarding an application of a transform to a current block of a video; and performing, based on the decision, a conversion between the current block and a bitstream representation of the video.

A2. The method of solution A1, wherein the one or more decoded coefficients are associated with one or more representative blocks in a color component identical to a color component of the current block.

A3. The method of solution A1, wherein the one or more decoded coefficients are associated with one or more representative blocks in a color component different from a color component of the current block.

A4. The method of solution A1, wherein a type of the transform is based on a decoded coefficient associated with the current block.

A5. The method of solution A1, wherein a type of the transform is based on a decoded coefficient associated with a second block different from the current block.

A6. The method of solution A5, wherein the second block is a neighbor to the current block.

A7. The method of solution A5, wherein the current block and the second block are coded with a same intra prediction mode.

A8. The method of solution A5, wherein a size of the current block is identical to a size of the second block.

A9. The method of solution A5, wherein the current block is in a luma component, and wherein the second block is in a chroma component.

A10. The method of solution A1, wherein a type of the transform is based a plurality of decoded coefficients associated with a plurality of blocks.

A11. The method of solution A10, wherein the plurality of blocks comprises the current block.

A12. The method of solution A10 or A11, wherein the plurality of blocks comprises at least one neighboring block of the current block.

A13. The method of solution A10, wherein the plurality of blocks comprises a last N decoded blocks before the current block in a decoding order, wherein each of the last N decoded blocks satisfies a condition, and wherein N is an integer greater than 1.

A14. The method of solution A13, wherein the condition comprises each of the last N decoded blocks being coded with a same intra prediction mode as the current block.

A15. The method of solution A13, wherein the condition comprises each of the last N decoded blocks having a same size as the current block.

A16. A method for video processing, comprising making a decision, based on a set of representative coefficients and in an absence of one or more transform indices, regarding an application of a transform to a current block; and performing, based on the decision, a conversion between the current block and a bitstream representation, wherein the set of representative coefficients is included in a set of significant coefficients, and wherein each of the set of significant coefficients is non-zero.

A17. The method of solution A16, wherein each coefficient in the set of significant coefficients is included in the set of representative coefficients.

A18. The method of solution A17, wherein the decision further comprises determining a transform type for the current block.

A19. The method of solution A16, wherein at least one coefficient in the set of significant coefficients is excluded from the set of representative coefficients.

A20. The method of solution A19, wherein the at least one coefficient is greater than or equal to a predetermined threshold value.

A21. The method of solution A19, wherein the at least one coefficient is less than or equal to a predetermined threshold value.

A22. The method of solution A19, wherein the at least one coefficient comprises a first K of the set of significant coefficients in a decoding order, wherein K is an integer, and wherein K≥1.

A23. The method of solution A19, wherein the at least one coefficient comprises a last K of the set of significant coefficients in a decoding order, wherein K is an integer, and wherein K≥1.

A24. The method of solution A16, wherein the set of representative coefficients comprises coefficients at one or more predefined locations in the current block.

A25. The method of solution A16, wherein the set of representative coefficients comprises coefficients at one or more predefined positions in a coefficient scanning order.

A26. The method of solution A16, wherein the set of representative coefficients comprises at least one zero coefficient.

A27. The method of solution A16, wherein the transform comprises a horizontal transform and a vertical transform, and wherein a type of the horizontal transform or a type of the vertical transform is based on a function of the set of representative coefficients.

A28. The method of solution A27, wherein the function is a cardinality of the set of representative coefficients.

A29. The method of solution A27, wherein the function is based on a sum of a value of each coefficient of the set of representative coefficients.

A30. The method of solution A27, wherein the function is based on a sum of an absolute value of each coefficient of the set of representative coefficients.

A31. The method of solution A27, wherein the function is a parity of a number of the set of representative coefficients.

A32. The method of solution A31, wherein the horizontal transform comprises a first transform and the vertical transform comprises a second transform when the parity is even, and wherein the horizontal transform comprises a third transform and the vertical transform comprises a fourth transform when the parity is odd.

A33. The method of solution A31, wherein when a current picture or a current slice comprising the current block is intra coded, the horizontal transform comprises a first transform and the vertical transform comprises a second transform when the parity is even, and the horizontal transform comprises a third transform and the vertical transform comprises a fourth transform when the parity is odd, and when the current picture or the current slice is not intra coded, the horizontal transform comprises the third transform and the vertical transform comprises the fourth transform when the parity is even, and the horizontal transform comprises the first transform and the vertical transform comprises the second transform when the parity is odd.

A34. The method of solution A32 or A33, wherein a type of the first transform is identical to a type of the second transform.

A35. The method of solution A32 or A33, wherein a type of the first transform is different from a type of the second transform.

A36. The method of solution A32 or A33, wherein a type of the third transform is identical to a type of the fourth transform.

A37. The method of solution A32 or A33, wherein a type of the third transform is different from a type of the fourth transform.

A38. The method of solution A31, wherein an I-slice or an I-picture includes the current block that is intra-coded, wherein the transform is a Discrete Sine Transform of Type VII (DST-VII) when the parity is even, and wherein the transform is a Discrete Cosine Transform of Type II (DCT-II) when the parity is odd.

A39. The method of solution A31, wherein a P/B-slice or a P/B-picture includes the current block that is intra-coded, wherein the transform is a Discrete Cosine Transform of Type II (DCT-II) when the parity is even, and wherein the transform is a Discrete Sine Transform of Type VII (DST-VII) when the parity is odd.

A40. The method of solution A31, wherein a type of the transform is based on a scan region comprising a smallest rectangle that covers the set of significant coefficients.

A41. The method of solution A29 or A30, wherein the horizontal transform comprises a first transform and the vertical transform comprises a second transform when the sum is smaller than a threshold, and wherein the horizontal transform comprises a third transform and the vertical transform comprises a fourth transform when the sum is greater than or equal to the threshold.

A42. The method of solution A41, wherein the threshold is based on a size of the current block.

A43. The method of solution A41, wherein the threshold is based on a quantization parameter associated with the current block.

A44. The method of any of solutions A32 to A43, wherein each of the first, second, third and fourth transforms is one of a Discrete Cosine Transform (DCT) of Type II (DCT-II), a DCT-VIII, a Discrete Sine Transform (DST) of Type VII (DST-VII), or a DST-VIII.

A45. A method for video processing, comprising selecting, as part of an implicit selection of transforms (IST) mode, one or more transforms of a transform set from a set of predefined transforms; and applying, as part of performing a conversion between a current block and a bitstream representation, at least one of the one or more transforms to the current block.

A46. The method of solution A45, wherein the transform set comprises a vertical transform set and a horizontal transform set.

A47. The method of solution A46, wherein the vertical transform set is identical to the horizontal transform set.

A48. The method of solution A46, wherein the vertical transform set is different from the horizontal transform set.

A49. The method of solution A45, wherein the transform set comprises a Discrete Cosine Transform of Type II (DCT-II) and a Discrete Sine Transform of Type VII (DST-VII).

A50. The method of solution A49, wherein the transform set further comprises an identity transform.

A51. The method of solution A45, wherein the transform set is based on at least one of a coding information of the current block, a color component, a partitioning structure for the current block, a slice type of a current slice comprising the current block, and a picture type of a current picture comprising the current block.

A52. The method of solution A51, wherein the transform set is based on a dimension of the current block.

A53. The method of solution A51, wherein the transform set comprises a Discrete Cosine Transform of Type II (DCT-II) and a Discrete Sine Transform of Type VII (DST-VII) when the current block is intra-coded.

A54. The method of solution A51, wherein the transform set comprises a Discrete Sine Transform of Type VII (DST-VII) and an identity transform when the current block is coded using an intra block copy (IBC) mode.

A55. The method of any of solutions A1 to A54, wherein the current block is an intra coded block.

A56. The method of any of solutions A1 to A54, wherein a set of coefficients associated with the current block is subject to a constraint.

A57. The method of solution A56, wherein each of the set of coefficients that is located out of a predetermined region of the current block is zero.

A58. The method of any of solutions A1 to A54, wherein the current block is configured to use a default transform when another transform is not selected.

A59. The method of solution A58, wherein the default transform is a Discrete Cosine Transform of Type II (DCT-II).

A60. A method for video processing, comprising making a decision, based on a coding mode of a current block of a video, regarding an application of an implicit multiple transform set (MTS) process to the coding mode regardless of a value of an indication of enabling an MTS process in a bitstream representation of the video at a sequence level, a picture level, a sub-picture level, a slice level, a tile group level, a tile level, a brick level, a coding tree unit (CTU) row, or a CTU level; and performing, based on the decision, a conversion between the current block and the bitstream representation, wherein the implicit MTS process includes using a characteristic of the current block to determine a transform used during the conversion.

A61. The method of solution A60, wherein the implicit MTS process is applied when the coding mode is an intra subblock partitioning (ISP) mode and the MTS process is disabled.

A62. The method of solution A60, wherein the implicit MTS process is applied when the coding mode is a subblock transform (SBT) mode and the MTS process is disabled.

A63. A method for video processing, comprising making a decision, based on an enablement of a multiple transform set (MTS) process for a video region of a video, regarding an enablement of an intra subblock partitioning (ISP) mode or a subblock transform (SBT) mode for the video region; and performing, based on the decision, a conversion between the video region and a bitstream representation of the video.

A64. The method of solution A63, wherein the video region comprises a sequence, a video, a picture, a slice, a tile group, a tile, a brick, a sub-picture, a coding tree unit (CTU) row, a CTU, a coding unit (CU) or a block.

A65. The method of solution A63 or A64, wherein the ISP mode and/or the SBT mode is disabled when the MTS process is disabled.

A66. The method of solution A63 or A64, wherein the bitstream representation comprises an explicit flag for the ISP mode and/or the SBT mode when the MTS process is enabled.

A67. The method of solution A63 or A64, wherein the ISP mode and/or the SBT mode is disabled when an implicit MTS process is disabled.

A68. A method for video processing, comprising making a decision, based on an enablement of an intra subblock partitioning (ISP) mode or a subblock transform (SBT) mode for a video region of a video, regarding an enablement of a multiple transform set (MTS) process for the video region; and performing, based on the decision, a conversion between the video region and a bitstream representation of the video.

A69. The method of solution A68, wherein the video region comprises a sequence, a video, a picture, a slice, a tile group, a tile, a brick, a sub-picture, a coding tree unit (CTU) row, a CTU, a coding unit (CU) or a block.

A70. The method of solution A68 or A69, wherein the MTS process is enabled when the ISP mode and/or the SBT mode are disabled.

A71. A method for video processing, comprising performing a conversion between a current block of a video and a bitstream representation of the video, wherein the bitstream representation comprises a first syntax element that controls a usage of an implicit multiple transform set (MTS) process on the current block and a second syntax element that controls a usage of an explicit MTS process on the current block, and wherein the first syntax element is different from the second syntax element, wherein the implicit MTS process includes using a characteristic of the current block to determine a transform used during the conversion.

A72. The method of solution A71, wherein the first syntax element and the second syntax element are signaled in the bitstream representation at a sequence level.

A73. A method for video processing, comprising making a decision, for a video region of a video, regarding an application of an implicit multiple transform set (MTS) process and/or an explicit MTS process to the video region using one or more control parameters that are based on a coding mode of the video region; and performing, based on the decision, a conversion between the video region and a bitstream representation of the video, wherein the implicit MTS process includes using a characteristic of the current block to determine a transform used during the conversion.

A74. An apparatus in a video system comprising a processor and a non-transitory memory with instructions thereon, wherein the instructions upon execution by the processor, cause the processor to implement the method in any one of solutions A1 to A73.

A75. A computer program product stored on a non-transitory computer readable media, the computer program product including program code for carrying out the method in any one of solutions A1 to A73.

Figure 18:
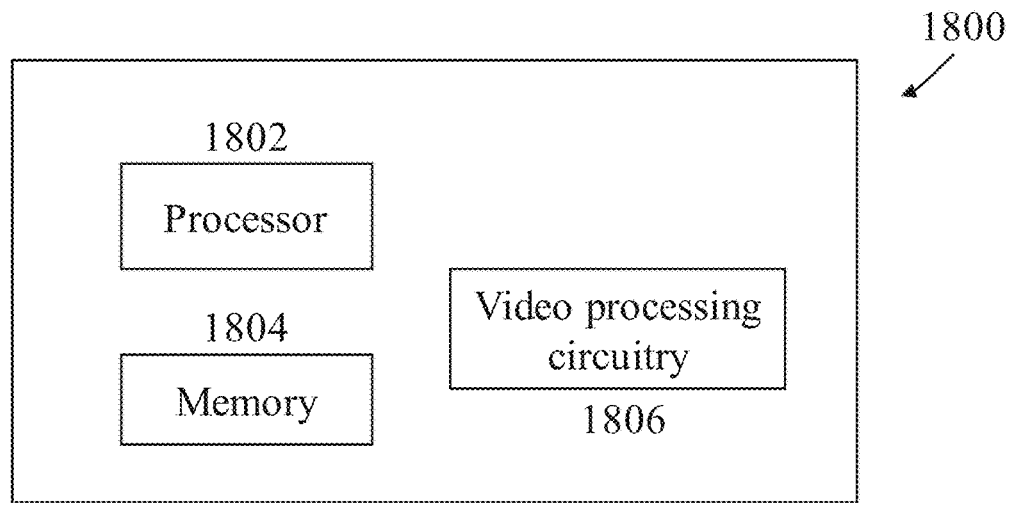
FIG. 18 is a block diagram of an example of a hardware platform for implementing a visual media decoding or a visual media encoding technique described in the present document.

FIG. 18 is a block diagram of a video processing apparatus 1800. The apparatus 1800 may be used to implement one or more of the methods described herein. The apparatus 1800 may be embodied in a smartphone, tablet, computer, Internet of Things (IoT) receiver, and so on. The apparatus 1800 may include one or more processors 1802, one or more memories 1804 and video processing hardware 1806. The processor(s) 1802 may be configured to implement one or more methods (including, but not limited to, methods 1705, 1710, 1715, 1720, 1725, 1730, 1735 and 1740) described in the present document. The memory (memories) 1804 may be used for storing data and code used for implementing the methods and techniques described herein. The video processing hardware 1806 may be used to implement, in hardware circuitry, some techniques described in the present document.

In some embodiments, the video coding methods may be implemented using an apparatus that is implemented on a hardware platform as described with respect to FIG. 18.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

Figure 19:
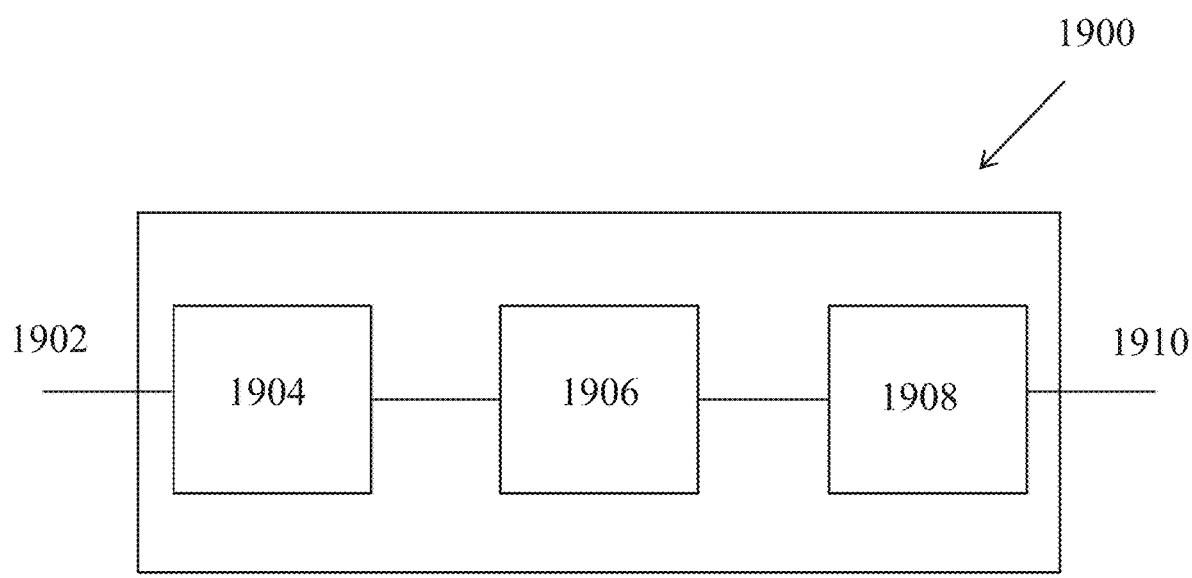
FIG. 19 is a block diagram of an example video processing system in which disclosed techniques may be implemented.

FIG. 19 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1900 may include a coding component 1904 that may implement the various coding or encoding methods described in the present document. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
   making a decision, for a conversion between a current block of a video and a bitstream of the video, based on a set of representative coefficients of the current block and/or one or more neighbouring blocks of the current block and in an absence of one or more transform indices, regarding one or more transform matrices applied to the current block in a transform process, wherein the one or more transform matrices comprises at least one of a horizontal transform matrix or a vertical transform matrix; and
   performing the conversion based on the decision,
   wherein the horizontal transform matrix or the vertical transform matrix is determined based on a parity of a number of representative coefficients in the set of representative coefficients, and
   wherein the current block applies an implicit selected transform for a primary transform, wherein the implicit selected transform is not applied to the current block when the current block is an intra-coded block with a derived tree (DT), wherein the implicit selected transform is applied under at least one condition including that a height and a width of the current block is no greater than a threshold, and wherein the threshold is a positive integer.

2. The method of claim 1, wherein the set of representative coefficients comprises partial of all coefficients of the current block and/or the one or more neighbouring blocks.

3. The method of claim 1, wherein the one or more transform matrices is based on a function of the set of representative coefficients, and an output of the function is a number of the set of representative coefficients.

4. The method of claim 1, wherein the horizontal transform matrix is identical to the vertical transform matrix.

5. The method of claim 4, wherein the horizontal transform matrix and the vertical transform matrix is one of a Discrete Cosine Transform (DCT) of Type II (DCT-II) or a Discrete Sine Transform (DST) of Type VII (DST-VII).

6. The method of claim 1, wherein the horizontal transform matrix is different from the vertical transform matrix.

7. The method of claim 6, wherein the horizontal transform matrix is a Discrete Sine Transform (DST) of Type VII (DST-VII), and the vertical transform matrix is a Discrete Cosine Transform (DCT) of Type II (DCT-II).

8. The method of claim 1, wherein the current block is coded with a specific mode, where the specific mode comprises an intra mode or an inter mode.

9. The method of claim 1, further comprising:
   performing a conversion between a second block of the video which does not apply an implicit selected transform and the bitstream, wherein a default Discrete Cosine Transform (DCT) of Type II (DCT-II) is used for the second block.

10. The method of claim 1, further comprising performing a conversion between a third block in a specific color format of the video and the bitstream, wherein the third block is coded with an intra block copy mode which uses reference samples in a same video region as the third block and a transform skip mode is allowed to be applied to the third block.

11. The method of claim 1, wherein the conversion includes encoding the current block into the bitstream.

12. The method of claim 1, wherein the conversion includes decoding the current block from the bitstream.

13. An apparatus for processing video data comprising a processor and a non-transitory memory with instructions thereon, wherein the instructions upon execution by the processor, cause the processor to:
   make a decision, for a conversion between a current block of a video and a bitstream of the video, based on a set of representative coefficients of the current block and/or one or more neighbouring blocks of the current block and in an absence of one or more transform indices, regarding one or more transform matrices applied to the current block in a transform process, wherein the one or more transform matrices comprises at least one of a horizontal transform matrix or a vertical transform matrix; and
   perform the conversion based on the decision,
   wherein the horizontal transform matrix or the vertical transform matrix is determined based on a parity of a number of representative coefficients in the set of representative coefficients, and
   wherein the current block applies an implicit selected transform for a primary transform, wherein the implicit selected transform is not applied to the current block when the current block is an intra-coded block with a derived tree (DT), wherein the implicit selected transform is applied under at least one condition including that a height and a width of the current block is no greater than a threshold, and wherein the threshold is a positive integer.

14. The apparatus of claim 13, wherein the set of representative coefficients comprises partial of all coefficients of the current block and/or the one or more neighbouring blocks, and the one or more transform matrices is based on a function of the set of representative coefficients, and an output of the function is a number of the set of representative coefficients, wherein the horizontal transform matrix is a Discrete Sine Transform (DST) of Type VII (DST-VII), and the vertical transform matrix is a Discrete Cosine Transform (DCT) of Type II (DCT-II).

15. A non-transitory computer-readable storage medium storing instructions that cause a processor to:
   make a decision, for a conversion between a current block of a video and a bitstream of the video, based on a set of representative coefficients of the current block and/or one or more neighbouring blocks of the current block and in an absence of one or more transform indices, regarding one or more transform matrices applied to the current block in a transform process, wherein the one or more transform matrices comprises at least one of a horizontal transform matrix or a vertical transform matrix; and
   perform the conversion based on the decision,
   wherein the horizontal transform matrix or the vertical transform matrix is determined based on a parity of a number of representative coefficients in the set of representative coefficients, and
   wherein the current block applies an implicit selected transform for a primary transform, wherein the implicit selected transform is not applied to the current block when the current block is an intra-coded block with a derived tree (DT), wherein the implicit selected transform is applied under at least one condition including that a height and a width of the current block is no greater than a threshold, and wherein the threshold is a positive integer.

16. The non-transitory computer-readable storage medium of claim 15, wherein the set of representative coefficients comprises partial of all coefficients of the current block and/or the one or more neighbouring blocks, the one or more transform matrices is based on a function of the set of representative coefficients, and an output of the function is a number of the set of representative coefficients,
   wherein the horizontal transform matrix is a Discrete Sine Transform (DST) of Type VII (DST-VII), and the vertical transform matrix is a Discrete Cosine Transform (DCT) of Type II (DCT-II).

17. A non-transitory computer-readable recording medium storing a bitstream of a video which is generated by a method performed by a video processing apparatus, wherein the method comprises:
   making a decision based on a set of representative coefficients of a current block of the video and/or one or more neighbouring blocks of the current block and in an absence of one or more transform indices, regarding one or more transform matrices applied to the current block in a transform process, wherein the one or more transform matrices comprises at least one of a horizontal transform matrix or a vertical transform matrix; and
   generating the bitstream based on the decision,
   wherein the horizontal transform matrix or the vertical transform matrix is determined based on a parity of a number of representative coefficients in the set of representative coefficients, and
   wherein the current block applies an implicit selected transform for a primary transform, wherein the implicit selected transform is not applied to the current block when the current block is an intra-coded block with a derived tree (DT), wherein the implicit selected transform is applied under at least one condition including that a height and a width of the current block is no greater than a threshold, and wherein the threshold is a positive integer.

18. The non-transitory computer-readable recording medium of claim 17, wherein the set of representative coefficients comprises partial of all coefficients of the current block and/or the one or more neighbouring blocks, and the one or more transform matrices is based on a function of the set of representative coefficients, and an output of the function is a number of the set of representative coefficients,
   wherein the horizontal transform matrix is a Discrete Sine Transform (DST) of Type VII (DST-VII), and the vertical transform matrix is a Discrete Cosine Transform (DCT) of Type II (DCT-II).

19. The apparatus of claim 13, wherein the horizontal transform matrix is identical to the vertical transform matrix.

* * * * *